US007010002B2

(12) United States Patent
Chow et al.

(10) Patent No.: US 7,010,002 B2
(45) Date of Patent: Mar. 7, 2006

(54) BROADBAND NETWORK WITH ENTERPRISE WIRELESS COMMUNICATION METHOD FOR RESIDENTIAL AND BUSINESS ENVIRONMENT

(75) Inventors: Albert T. Chow, Hillsdale, NJ (US); Robert Raymond Miller, II, Convent Station, NJ (US); Jesse E. Russell, Piscataway, NJ (US); Wenchu Ying, Cedar Knolls, NJ (US); Jinman Kim, Chatham, NJ (US); Richard Henry Erving, Piscataway, NJ (US)

(73) Assignee: AT&T Corp., New York, NY (US)

( * ) Notice: Subject to any disclaimer, the term of this patent is extended or adjusted under 35 U.S.C. 154(b) by 926 days.

(21) Appl. No.: 09/881,111

(22) Filed: Jun. 14, 2001

(65) Prior Publication Data

US 2002/0191635 A1 Dec. 19, 2002

(51) Int. Cl.
*H04J 1/00* (2006.01)

(52) U.S. Cl. ...................................... 370/485; 370/352

(58) Field of Classification Search ................ 370/485, 370/486, 487, 352, 353
See application file for complete search history.

(56) References Cited

U.S. PATENT DOCUMENTS

| | | | | |
|---|---|---|---|---|
| 5,991,292 A * | 11/1999 | Focsaneanu et al. | ........ | 370/352 |
| 6,029,067 A | 2/2000 | Pfundstein | | |
| 6,041,048 A | 3/2000 | Erickson et al. | | |
| 6,335,936 B1 * | 1/2002 | Bossemeyer, Jr. et al. | .. | 370/420 |
| 6,404,763 B1 * | 6/2002 | Renucci et al. | ............. | 370/352 |

(Continued)

FOREIGN PATENT DOCUMENTS

| | | |
|---|---|---|
| EP | 0 708 572 | 4/1996 |
| WO | 0 766 490 | 4/1997 |

OTHER PUBLICATIONS

M. Ali Salman et al., "The Future of IP-PSTN Interworking", 38th European Telecommunication Congress. Proceedings Networking The Future, Aug. 24, 1999, pp. 163-167.

*Primary Examiner*—Chi Pham
*Assistant Examiner*—Blanche Wong

(57) ABSTRACT

The present invention sets forth a network-centric service distribution architecture and method that integrates a wireless access system/service in the residence, SOHO, business or public environment through the use of a local broadband network, such as a Residential-Business Broadband Network (RBN), to the service provider's broadband transport network and to a service provider's broadband packet network that facilitates end-to-end packet telecommunication services. Access functions for connecting said service provider's broadband packet network to the RBN via said service provider's broadband transport network are provided. Call and service termination functions to a plurality of local RBN devices are also provided. Signals from a plurality of wireless devices are accepted and forwarded to an IEEE 802.11b interface for a wireless modem and/or to an Ethernet interface for a Voice over Internet Protocol (VOIP)/Ethernet Processor, where the forwarded signals comprise intranet telephony and data. Voice signals are also accepted from a plurality of tip/ring interfaces and forwarded to a broadband transport interface for back haul of data and voice packets. A service provider can deploy services in an integrated voice, data and multimedia environment cost-effectively based on one broadband packet network.

23 Claims, 9 Drawing Sheets

U.S. PATENT DOCUMENTS

| | | | | |
|---|---|---|---|---|
| 6,407,997 | B1 * | 6/2002 | DeNap et al. | 370/352 |
| 6,424,646 | B1 * | 7/2002 | Gerszberg et al. | 370/352 |
| 6,526,046 | B1 * | 2/2003 | Carew | 370/352 |
| 6,728,238 | B1 * | 4/2004 | Long et al. | 370/352 |
| 6,751,441 | B1 * | 6/2004 | Murray et al. | 455/7 |
| 6,775,273 | B1 * | 8/2004 | Kung et al. | 370/356 |
| 6,785,265 | B1 * | 8/2004 | White et al. | 370/352 |
| 2001/0030950 | A1 * | 10/2001 | Chen et al. | 370/329 |
| 2001/0033585 | A1 * | 10/2001 | Lazarus et al. | 370/535 |
| 2002/0131387 | A1 * | 9/2002 | Pitcher et al. | 370/338 |
| 2002/0191644 | A1 * | 12/2002 | Swisher et al. | 370/487 |
| 2004/0047310 | A1 * | 3/2004 | Chen et al. | 370/329 |
| 2004/0047358 | A1 * | 3/2004 | Chen et al. | 370/401 |

* cited by examiner

BROADBAND NETWORK WITH ENTERPRISE WIRELESS COMMUNICATION METHOD FOR RESIDENTIAL AND BUSINESS ENVIRONMENT

RELATED APPLICATION

The present application is related to "Broadband Network with Enterprise Wireless Communication System for Residential and Business Environment", by Albert T. Chow, Robert R. Miller, Richard H. Erving, Jinman Kim, Wenchu Ying and Jesse E. Russel, which is being filed concurrently.

FIELD OF THE INVENTION

The present invention relates to communications between users in diverse communication systems and, more particularly, to providing a wireless local access system/service in the home, Small Office Home Office (SOHO), business and public environments by utilizing a service provider's broadband transport network to a service provider's broadband packet network, an Internet Protocol Telephony Network, and public switched telephone network. Specifically, this invention relates to broadband network access for users in the above-mentioned environments. The invention extends the scheme of wired Virtual Private Networks (VPNs) to include duplicate wireless elements in home and office. These elements allow users to experience identical service behaviors in both locations, effectively creating a "work" wireless feature environment at home, as well as a "home" wireless feature environment at work.

BACKGROUND OF THE INVENTION

Present day telephony voice networks are built around circuit switches, end offices, a toll network, tandem switches, and twisted pair wires. These voice networks are referred to as a Public Switched Telephone Network (PSTN) or Plain Old Telephone Service (POTS). Due to bandwidth limitations of Plain Old Telephone Service (POTS), there is an inherent inability to efficiently integrate multiple types of media such as telephony, data communications (including video) for Personal Computers (PC), and Television (TV) broadcasts. Accordingly, a new broadband architecture is required. This new architecture gives rise to a new array of user services.

There are limitations on communication services provided to the public for accessing communication networks. The most common access points to communication networks are POTS connections in the residences, SOHO, business and public environments. However, these access points are limited to voice telephone calls and offer practically no additional calling services. Connections for users to access communication networks for transmitting and receiving data is mostly limited to low-speed dial-up (e.g., 28 kbps or slower), kiosks located in public areas for Web browsing, or dedicated trunks (e.g., T1) in business locations. As the demand for increased sophistication of telecommunication services increases, providing users with residential and SOHO/business high-speed communication networks will be required.

The evolution of business enterprises toward a more decentralized business environment coupled with new work styles and flexible organization structures has changed where, when and how users and professionals conduct and achieve their daily residential and business objectives. In particular, the following shifts in user and business needs can be observed:

a. The challenges of supporting an increasingly mobile workforce requires corporations and businesses to focus on providing mobility and service profile portability to them.

b. The emergence of wireless as a "primary" phone, prompting demand for one phone, one number, anytime, anywhere communications.

c. Increasing numbers of computing resources in the home necessitate the ability to link these elements together in order for consumers to leverage their usage and capabilities.

d. Increasing the number of households that access to the Internet.

Therefore, a need exists for users to be able to utilize a residential or SOHO/business service architecture together with a flexible wireless networking platform that links all the preselected residential or SOHO/business devices wirelessly.

SUMMARY OF THE INVENTION

The present invention implements a network-centric service distribution architecture that integrates a wireless access system/service in the residence, SOHO, business or public environment through the use of a local broadband network (i.e., Residential/Business Broadband Network—RBN) to the service provider's broadband transport network and to a service provider's broadband packet network as depicted in the FIG. 1 that facilitates end-to-end packet telecommunication services. The integration of an RBN to a service provider's broadband packet network allows a subscriber to communicate at home and at the office with one communication device anywhere. A service provider can deploy services in an integrated voice, data and multimedia environment cost-effectively from its broadband packet network to the RBN.

In the architectural perspective, the service provider's network generally includes a broadband packet network (e.g., IP-based packet network), a broadband transport network (e.g., generic Digital Subscriber Line (xDSL), Hybrid Fiber Coax (HFC), Fixed Wireless, Fiber Optical Link etc.) and a local broadband network, RBN, (located within a residence, SOHO, business or public mall) that consists of Media Terminal Adapter (MTA) and associated access port(s) that are linked to the Media Terminal Adapter via a network (e.g., Ethernet) or alternatively via a traditional telephone twisted-pair line interface. The Media Terminal Adapter is coupled to the access port(s) and via the service provider's broadband transport network to the service provider's broadband packet network. The Media Terminal Adapter is used for providing access functions for connecting the service provider's broadband packet network with the RBN via the service provider's broadband transport network. The access port is coupled to the Media Terminal Adapter via either a network (e.g., a Local Area Network—LAN) or simply via a traditional POTS (i.e., telephone twisted pair) line interface. The access port receives and sends wireless signals to a plurality of wireless devices. This architecture also allows the user to control these devices remotely from the residence, business, SOHO or public environments. Also, the Network Server Platform (NSP) in the service provider's broadband packet network controls and administers the operation of the access ports and the service requests of the wireless devices associated with these access ports.

Typically, the RBN is coupled to the service provider's network via the Media Terminal Adapter using a broadband transport network that is comprised of a HFC cable system or xDSL. In business/SOHO environments, a private branch exchange (i.e., PBX) that is capable of supporting packet telephony (via the Media Terminal Adapter, and the service provider's broadband transport network and service provider's broadband packet network) may be coupled to the RBN for business telephony features to the RBN associated wired and wireless telephones. This PBX can also be optionally coupled to the public switched telephone network.

Generally, the access port is a miniaturized radio base station that is used to establish analog and/or digital communications channels. It interworks between the wireless and packet telephony protocols (including voice transcoding) to provide end-to-end communications between the service provider's packet network and the associated wireless handsets. Where desired, the access port and the Media Terminal Adapter may be integrated into a single unit, such as an intelligent broadband access point unit, to provide the functions of the access port and the Media Terminal Adapter.

The RBN is typically a home network or business network which has a plurality of RBN devices such as home devices, computing/telephony resources and appliances. The present invention also provides a method for network-centric service distribution to a wireless access system in the residence, SOHO, business or public environment through the use of a RBN to the service provider's broadband transport network and to a service provider's broadband packet network that facilitates end-to-end packet telecommunication services. The method typically includes the steps of using a Media Terminal Adapter that is coupled to an access port(s) via a network (e.g., LAN) or a traditional twisted-pair telephone line interface. The Media Terminal Adapter is also coupled to a broadband transport network that includes hybrid fiber coaxial cable, or alternatively xDSL, of the service provider's broadband packet network to provide access functions for connecting the service provider's broadband packet network with the RBN, and the Media Terminal Adapter uses the access port(s) to receive and send wireless signals to a plurality of wireless devices in accordance with the call and service termination communications. A single integrated unit may perform these steps or, alternatively, two separate units, for example, where an access port and Media Terminal Adapter are utilized. Where desired, the RBN may be coupled to the service provider's broadband packet network using a HFC cable system or xDSL. The RBN is typically a home network or a business network.

In one embodiment, a computer-readable medium having computer-executable instructions is used for remotely accessing a broadband home network. In this embodiment, the computer-executable instructions perform the steps of the method.

BRIEF DESCRIPTION OF THE DRAWINGS

The foregoing summary of the invention, as well as the following detailed description of preferred embodiments, is better understood when read in conjunction with the accompanying drawings, which are included by way of example, and not by way of limitation with regard to the claimed invention.

DETAILED DESCRIPTION OF THE PREFERRED EMBODIMENTS

Figure 1:
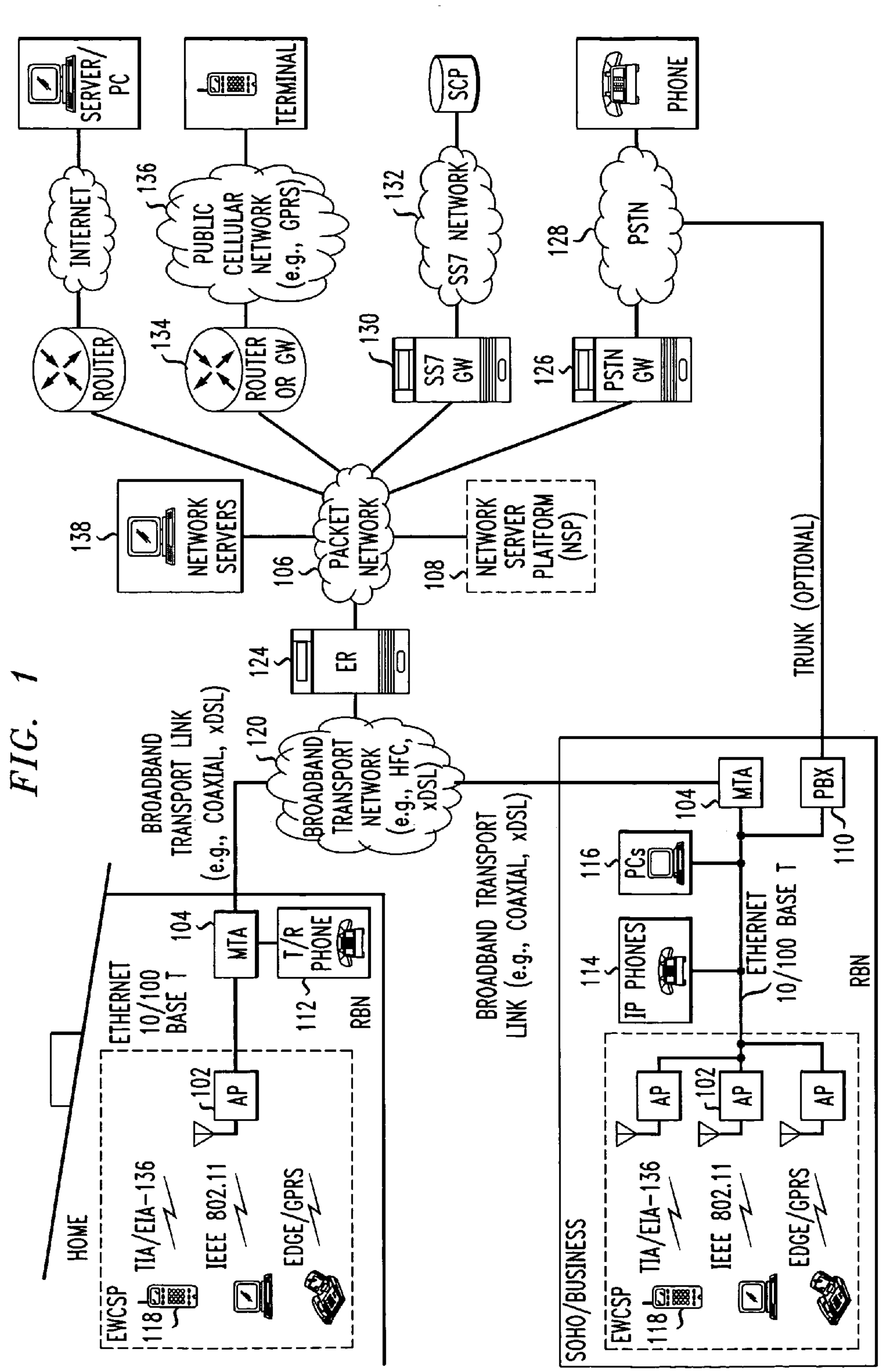
FIG. 1 is a schematic representation of an architecture for one embodiment of broadband networking for home, small office home office (SOHO) and business in accordance with the present invention.

The present invention implements a network-centric service distribution architecture that integrates a wireless access system/service in the residence, SOHO, business or public environment through the use of a RBN to the service provider's broadband transport network and to a service provider's broadband packet network that facilitates end-to-end packet telecommunication services. This invention also provides for access and control of home and/or office computing resources, devices, and appliances (locally or remotely) via a service provider's broadband transport network access to the home or office and related apparatus and methodology for home and office networking. Currently, when people travel they must relinquish the access of their home and office computing resources in addition to their home appliances and devices due to lack of capability to access these resources and devices. Making these resources available to a traveler remotely through wired or wireless means provides convenience to the user. The service architecture, the methodologies and apparatuses enable a traveler to "carry or reach" their office or residential environments even when they are located at a remote location. For example, a user may turn on or off the air conditioner, check home or office security, prepare dinner by turning on the oven, access e-mail, send and receive data messages, utilize home computing resources, etc. For ease of reading, many references below are addressed simply to the home environment and home resources. However, as used herein, such references also are intended to include the office environment and office resources applicable in the enterprise environment. Therefore, the present invention provides for broadband network access for the home, small Office Home Office (SOHO) environment and for the enterprise environment.

In residential use, the present invention provides a home with broadband network access together with a flexible wireless networking platform that provides service via links to all the applicable home devices and appliances wirelessly. The service provides broadband access to the home, a home networking apparatus, methodology and architecture that links all the home computing and telephony resources, appliances, electronics, and preselected devices to a service provider's broadband packet network, provides for distribution of services from a carrier service provider to the home and to the home networking devices, thus making available a multiplicity of new home services.

Three key wireless access technologies/standards, TIA/EIA-136, General Packet Radio Service (GPRS)/Enhanced Data for Global Evolution (EDGE), and IEEE 802.11b Wireless LAN, are used to define basic residential and/or small business services, and the inter-working methodologies that allow a traveler to "carry" his home and/or small business resources anywhere. However, these standards are for illustrative purposes only and any practices that are based on differences or variations of given home or small business network apparatuses and/or broadband network access to the home and/or small business environments and/or wireless protocols shall be within the scope of the invention. For example, the IEEE 802.15 Wireless Personal LAN (i.e., Bluetooth) or the Cellular Digital Packet Data (CDPD) standard may be used instead of IEEE 802.11b, and any second-generation or third-generation standard wireless protocol (e.g., Global System for Mobile communications (GSM), Call Division Multiple Access (CDMA) (i.e., IS-95 High Data Rate (HDR)), CDMA2000, Wideband CDMA (WCDMA), or Personal Handyphone System (PHS)) can be used instead of TIA/EIA-136).

The wireless industry (i.e., Personal Communications Service (PCS) and cellular service) has revolutionized how people communicate, especially when they are on the move. However, the habit of using a wired telephone at home and in the office remains the same simply because wireless communication costs more than wired, provides poorer voice quality than wired telephony, and does not have adequate local RF coverage due to blind spots and often limited radio capacity in densely populated areas. The emerging broadband access (e.g., HFC cable, fixed wireless, xDSL such as Asymmetric DSL (ADSL), High-bit-rate DSL (HDSL), Integrated Digital Service Network (ISDN) DSL (IDSL), Symmetric DSL (SDSL) and Very-high-data-rate DSL (VDSL), the Local Multipoint Distribution System (LMDS), and the Microwave Multipoint Distribution System (MMDS), to the home creates opportunities for new services including the integration of wireless communication for home and office (i.e., SOHO) environments. A base station or stations located in the home for local wireless access service may provide effective RF coverage anywhere within a home with quality of service. In addition, a base station may provide the linkage between the service provider's broadband network and the subscriber's home networking devices to allow a service provider to distribute value-added services to the home conveniently.

The methodology of the present invention integrates second-generation and third-generation wireless services in the home with broadband access to a service provider's network. Enterprise Wireless Communications Service Platform (EWCSP) is the wireless access networking system/platform. EWCSP uses a conventional (e.g., second generation) wireless standard communication system to provide wireless services in-doors. It consists of miniaturized radio base stations (i.e., access ports) located in the residence, SOHO, business, or public environments that communicate with a plurality of wireless devices. EWCSP provides accesses and services from the service provider's broadband packet network via a service provider's broadband transport network. A system controller, the NSP, residing in the service provider's broadband packet network, controls and administers the access ports and associated service requests. A service provider can distribute services via the broadband home access devices through the EWCSP to the subscriber at home. Some examples of such services are voice, data, short message service, home networking related device control and linkage to the home PC for remote access at a desired time wirelessly.

FIG. 1 is a schematic representation of an architecture for one embodiment of broadband networking for home, Small Office Home Office (SOHO) and business in accordance with the present invention. The present invention includes both service and equipment elements. The equipment portion of the invention typically consists of a special miniaturized radio base station (i.e., access port) that may establish analog and/or digital communication channels, and interworks between the wireless and packet telephony protocols (including voice transcoding). The function can be provided efficaciously by the EWCSP Access Port (AP) 102. The AP unit 102 is based on Digital Radio Processing (DRP) techniques that accomplish transmission and reception of wireless radio signals by numerical rather than conventional analog processing means. The AP unit 102 supports a standard air interface (e.g., TIA/EIA-136) and packet telephony protocols (and associated voice coding schemes) and is connected via a wired line interface (e.g., Ethernet or ISDN/Basic rate Interface (BRI) line interface as shown in FIG. 1) to the Media Terminal Adapter (MTA) 104. The MTA 104 is connected via a broadband transport link (for example, via the HFC network, xDSL, or the like) to the service provider's broadband packet network 106. The MTA 104 provides access functions that connect between a service provider's broadband packet network 106 and the home devices via the service provider's broadband transport network 120. The MTA 104 and the AP unit 102 may be two physically distinct and interconnected units or they can be confined within one physical unit (see FIG. 9). For purposes of the description for FIG. 1, the MTA 104 and the AP unit 102 are considered as two separate units. The RBN in the home network in the residential environment or business network in the SOHO/business environment is the local broadband network that consists of the MTA interconnected to the AP, the associated wireless devices including any home devices and resources, computing devices and resources and appliances communicating wirelessly with the AP, and associated wired devices including computing devices and resources and telecommunication devices and resources communicating with the MTA and AP. The MTA can be entirely within the RBN, entirely within the service provider's broadband transport network or split between the RBN and the service provider's broadband transport network.

The system controller, the Network Server Platform (NSP) 108, for the APs is located in the service provider's broadband packet network. The home network, the service provider's broadband transport network, and the service provider's broadband packet network are all based on packet/cell format (e.g., Internet Protocol (IP)/Asynchronous Transfer Mode (ATM). When the connection between the AP 102 and the MTA 104 is an ISDN/BRI link, the MTA 104 acts as a concentrator or channel bank (i.e., multiplexer/de-multiplexer) for all the line interfaces from the AP(s) 102.

Q.931 signaling is used only to establish the B-channels between the AP 102 and the MTA 104; packetized voice or data are then sent over the B-channels through the service provider's broadband packet network to their end destinations. Thus, the present invention provides home, SOHO and business (broadband) wireless services and home or business networking, typically using EWCSP via broadband access to a service provider's broadband packet network.

Service provided by the present invention includes:

a. When a home's or business's resources are connected to a home or business networking platform that has broadband access to the service provider's broadband packet network, users with predetermined security privileges can remotely access any or all resources/appliances in or around the home or office via the service provider's broadband packet network. Thus, the home or business networking platform with the broadband network connectivity establishes a communications conduit for a subscriber at one end of the conduit to remotely access, control, monitor, and share the home's or business's resources at the other end of the conduit. This conduit also enables the delivery of traditional communication/entertainment services and new services. Depending on the RF coverage of the AP 102, the power of the AP 102 may be adjusted for coverage up to, for example, a mile or more in radius and therefore the services architecture may include the campus, public, or enterprise environments.

b. A home or business with broadband network connectivity and a home or business networking platform enables the service provider to distribute value-added network services (e.g., voice telephony) at any desired place within the home or business.

c. A home or business with broadband network connectivity and a home or business networking platform enables a content service provider to render services transparently/directly to home or business via the service provider's broadband packet network.

d. A home or business with broadband network connectivity and a home or business networking platform enables a subscriber to deliver and receive calls via a service provider's broadband packet network to and from the traditional PSTN and associated wireless PCS/Cellular networks. The services typically include all traditional service features and applications (i.e., voice, data etc.)

e. A home or business with broadband network connectivity and a home or business networking platform enables a subscriber to send, receive and browse information via a service provider's broadband packet network to and from the traditional data/voice packet network (i.e., Internet). The services typically include traditional Internet service features and applications.

FIG. 1 is a schematic representation of a high-level home or business networking service architecture based on the EWCSP for the home, SOHO and business environments. In the SOHO or business environment, a PBX 110 (as shown in FIG. 1) delivers feature applications or, alternatively, the service provider's broadband packet network can deliver such features, as in the circuit-switched Centrex model (not shown).

As used herein, the following terms have the definitions recited below:

a. Tip/Ring (T/R) Phone 112—Normal telephony Customer Provided Equipment (CPE) with RJ-11 interface to the MTA. For example, the phone may be a touch-tone telephone, fax machine, or analog modem.

b. IP Phone 114—IP telephone with digital processing capability to support multiple codecs and communications protocols, echo cancellation with an Ethernet interface.

c. Personal Computer (PC) 116—Customer's PC with a home or business networking interface (e.g., IEEE 802.11b and/or Ethernet).

d. Wireless Phone 118—Standard second-generation or third-generation wireless telephone with home or business networking interfaces (e.g., TIA/EIA-136, or EDGE/GPRS).

e. Access Port (AP) 102—EWCSP Access Port connected to MTA. The AP and MTA may be physically one unit or two physically distinct and interconnected units.

f. Media Terminal Adapter (MTA) 104—Media terminal equipment integrated with a modem for access to the service provider's broadband transport network and to the service provider's broadband packet network. The modem interfaces with the transport infrastructure: for example, if the HFC plant is used, then the modem is a cable modem: alternatively, if ADSL is used, then the modem is an ADSL modem. MTA digitally encodes multimedia signals, encapsulates the encoded signal in IP packets, and delivers the packets to the network via the modem. The multimedia signals may be either analog or digital. The MTA maintains a call state for each active telephone line and participates in call signaling and telephony feature implementation. The AP and MTA may be physically one unit or two physically distinct and interconnected units. The modem receives IP packets from either the Media Terminal Adapter or PC and packages and sends them through the service provider's broadband transport network using the appropriate interface. For example, for the HFC transport network, the interface is defined in DOCSIS 1.1.

g. Service Provider's Broadband Transport Network 120—standard transport infrastructure that comprises one or more of HFC, xDSL, fixed wireless, fiber optic, etc. For example, the HFC Network is a standard two-way cable plant with at least one 6 MHz downstream channel and several 2 MHz upstream channels designated for cable modem IP services. This HFC network includes the Cable Modem Termination System (CMTS) that terminates the 2 MHz upstream channels and originates the 6 MHz downstream channel used for CM IP services. CMTS implements the Medium Access Control (MAC) over the HFC network as defined in DOCSIS 1.1.

h. Edge Router (ER) 124—Enforces the Quality of Service (QoS) policies and is the access router for the packet network i. Service Provider's Broadband Packet Network 106—Packet access and backbone network supporting packet transport, VPN, and QoS needed for isochronous media service.

j. Network Server Platform (NSP) 108—Administers the wireless terminals, including call processing, Operations, Administration and Maintenance (OA&M), terminal mobility, personal mobility, location mobility, and RF management. It interworks with the other servers and/or gateways (GWs) to establish a call end-to-end. The NSP platform 108 also functions as a transaction server that participates in call processing and controls access to network resources (including QoS in the packet network). It translates E.164 addresses to destination packet addresses either internally or by accessing the Directory Server. The NSP platform 108 may physically consist of several servers.

k. PSTN Gateway 126—Translates packet streams to standard Time Division Multiplexed (TDM) trunks in the PSTN. It interfaces to necessary PSTN services with trunk-based multi-frequency (MF) interfaces (e.g., 911 offices, operator services platforms).

l. Public Switched Telephone Network (PSTN) 128—Gateways will need to interface with several existing circuit switched networks.

m. Signaling System 7 (SS7) Gateway 130—Translates signaling from the Gate Controllers to standard SS7 signaling. Accesses 800 Portability and Local Number Portability (LNP) databases in the SS7 network.

n. SS7 Network 132—SS7 Gateways will need to access several different existing SS7 networks.

o. Router 134—Packet routers with QoS functionality.

p. Cellular Network 136—Network of base stations, systems and associated elements needed to communicate with wireless devices for cellular or PCS service.

q. PBX 110—PBX with packet-switched (e.g., Ethernet) and circuit-switched (e.g., T1, ISDN/Primary Rate Interface (PRI), etc.) interfaces providing traditional PBX features and supporting multiple communication protocols (e.g., Session Initiation Protocol (SIP), Media Gateway Control Protocol (MGCP), ISDN, analog, etc) and voice encoding schemes (circuit-switched and packetization). The PBX supports call delivery to the packet and/or PSTN networks.

r. Network Servers 138—Home networking, IP telephony and OA&M servers such as:

s. PSTN Media Gateway Controller (MGC)—The overall PSTN interworking function is controlled by a Media Gateway Controller, which, together with the PSTN Gateway and the SS7 Gateway, is interpreted as an SS7-capable circuit switch to the PSTN.

t. Network Resources—Several network resources are needed to support data/telephony service. For example, Announcement Servers may be used to deliver audio announcements to customers, and network bridges may be used for multi-point conferences.

u. Directory Server—Contains E.164 number-to-IP address translation information. An E.164 number may be translated to either the IP address of a home device, the PSTN Gateway, or the IP address of a NSP. Responds to translation requests from the NSP.

v. Authentication Server—Contains authentication information that is used to validate a MTA's identity claim. Responds to authentication requests from the NSP.

w. Dynamic Host Configuration Protocol (DHCP) Server—Assigns IP addresses to MTAs and PCs for the high-speed data service.

x. Domain Name Server (DNS)—Standard DNS for high-speed data service.

y. Short Message Server—A Short Message server for low-speed home control services. The server may also interwork with public macrocellular Short Message Service center for delivery of Short Message Service message to wireless devices within the home or business network. This short message server and associated wireless devices may use any standard second-generation or third-generation wireless protocols, e.g., TIA/EIA-136, Cellular Digital Packet Data (CDPD).

z. DN—Directory Number.

aa. RTP—Real-Time Protocol—An application sublayer protocol (part of ISO Layer 7) which provides the common real-time services required by any application sending and receiving delay-sensitive traffic, such as voice and video. Includes mechanisms such as time stamps and sequence numbers which provide the receiver with the timing information necessary for a proper layout. Also includes mechanisms to support multiplexing of multiple real-time flows between the same layer 4 ports in communicating endpoints.

bb. RTCP—Real-Time Control Protocol—An application sublayer protocol that provides out-of-band control information for an associated RTP flow. Enables performance reports on parameters such as lost packets and jitter for the RTP flow to be sent from the receiver to the transmitter.

The following describes a series of embodiments of wireless access schemes for a subset of the wireless interface standards that may be adapted by the AP 102 and the available services in accordance with the present invention.

TIA/EIA-136

When the AP 102 supports the TIA/EIA-136 TDMA air interface, it radiates a digital "setup" channel signal in the frequency range that is allocated for the EWCSP system that is serving the area. The transmitted power of the signal is reduced to a level that allows it to "reach" only within the subscribed home, SOHO, office, public, or campus parameters, thus rendering its signal "invisible" to handsets outside of these targeted boundaries (e.g., public macrocellular network). The subscriber may use the same wireless telephone 118 at home, on the road, and in the office. In the home environment, the wireless telephone 118 behaves as a cordless extension of the home telephone, and likewise, in the office environment, the same telephone behaves as a cordless extension of the office telephone (e.g., in-building wireless office service). In both cases, no airtime charges are accrued, and the user is billed according to the normal wired local telephony subscription plan. When the subscriber is on the road, the wireless phone is reached by its Mobile Identification Number (MIN), it communicates with the macrocellular network for mobile calls, and the calls are billed according to the user's cellular calling plan. This architecture may also support the termination of MIN-based calls to the wireless telephone in the home or office environment by interworkings between EWCSP and the macrocellular public network.

In the home environment, the wireless Short Message feature (e.g., as defined in TIA/EIA-136) may be used for supporting one-way/two-way low-speed home control features such as home appliances, electronics, devices, etc., in accordance with the present invention. The following are several embodiments using the Short Message feature in accordance with the present invention. (Note that the CDPD standard could also be used to send these short messages.):

1. A subscriber is on the way home and logs onto the service provider's web site. After an authentication and authorization process, he sends a short message to the thermostat in his house, via connectivity to his home networking platform, to turn the air conditioner to a cooler setting. When he arrives home, the house is at a comfortable temperature.

2. A subscriber's refrigerator is not functioning properly and the refrigerator has been programmed to send alert messages to the subscriber via short message feature; in turn, the subscriber sends a short message to the refrigerator (via the home networking platform) to run a diagnostic check.

After the test, the refrigerator sends the results back in another short message so that the subscriber may determine appropriate action.

3. A subscriber authorizes the manufacturer of a newly purchased refrigerator to access his refrigerator through the service provider's broadband packet network to his home networking platform to run regular maintenance checks, etc.

Through a service provider's broadband packet network connection, there are many other potential services (e.g., programming VCRs, car maintenance, utility reading, electrical consumption monitoring of appliances, etc.) that may be implemented, depending on the appliance/device.

Home Control of a TIA/EIA-136-enabled Appliance via the TIA/EIA-136 Short Message Feature The call flows described below are for illustrative purposes only, and are not meant to follow the exact message format of a specific call-signaling standard. The communication exchange between the NSP and the Network Servers, and between the NSP and the AP, and the AP and the VCR are illustrated accordingly to the ANSI-41 and TIA/EIA-136 standard respectively. However the exchange between the Web-enabled wireless terminal (e.g., wireless Personal Digital Assistant (PDA)) and the Network Servers are in English descriptive language and do not adhere to any specific protocol. ANSI-41 is a known standard in the industry and is used during the exchange of SMS messages between the SMS Center in the network and TIA/EIA-136 terminal. By supporting the ANSI-41 standard, the NSP can also interwork with the public macrocellular system for delivery of MIN-based calls and SMS messages to the Mobile Station (MS) in the home network. Note that any second-generation or third-generation wireless standard that supports the SMS feature can also be used, e.g., GSM. The access port can also communicate with wireless enabled devices using a short message process adapted to support home control service aspects. That is, the short message process may not actually use or be a standard short message service as opposed to a process that resembles a short message service and is herein denominated a short message process.

Figure 2:
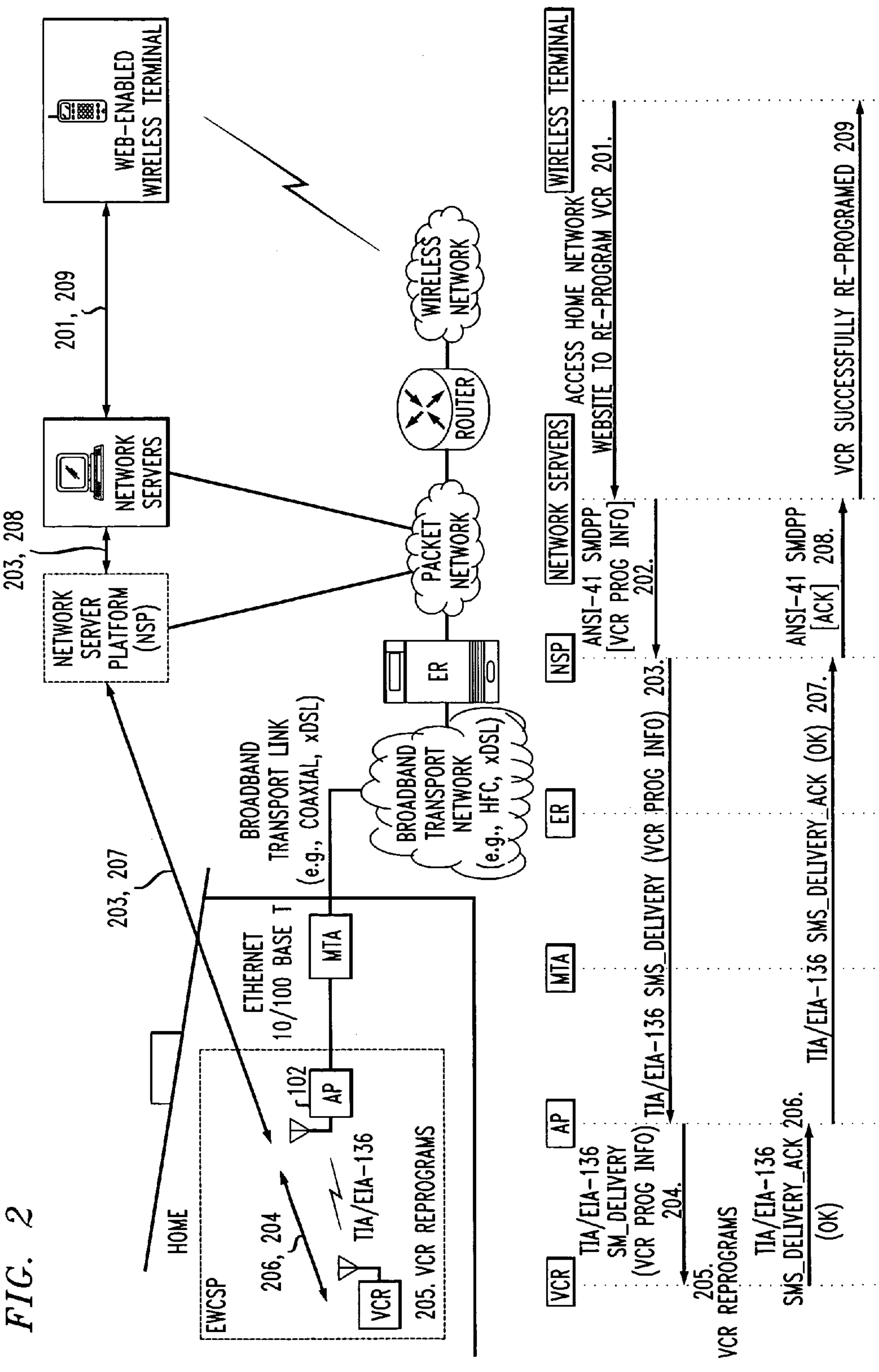
FIG. 2 is a combined schematic representation and flow chart for one embodiment of a home control scheme based on TIA/EIA-136 Short Message feature in accordance with the present invention.

FIG. 2 shows one embodiment of a scheme for call flows for a short message-based Home Control Implementation using the TIA/EIA-136 Short Message feature:

201. A subscriber has programmed his VCR to tape a major sports event while he is away from home. The VCR is equipped with a TIA/EIA-136 radio and capable of processing TIA/EIA-136 SMS messages. He discovers that the event has been delayed by an hour. He uses his Web-enabled wireless PDA to log on to the Home Networking Web site, and after an authentication procedure, he is authorized to communicate with his home network. He selects an option on the Web page to send a message to his VCR. He enters the command to reset the VCR programming to the new time.

202. The associated server creates a message (e.g., an SMS in the format of ANSI-41 SMSDeliveryPointToPoint, SMDPP) containing the VCR command, and sends this to the NSP.

203. The NSP translates the (ANSI-41) message into a TIA/EIA-136 SMS_DELIVER message. The NSP retrieves the IP address for the AP of the subscriber's home network, wraps the TIA/EIA-136 message in an IP message, and sends this to the AP.

204. When the AP receives the message, it extracts the SMS message and sends it to the VCR.

205. The VCR receives the SMS message, and resets the program time.

206. If the user wishes to be notified of the result, the VCR responds to the AP with a successful TIA/EIA-136 SMS_DELIVERY_ACK message.

207. The AP forwards the SMS_DELIVERY_ACK message to the NSP in an IP message.

208. The NSP sends a successful command acknowledgement message (e.g., in the format of ANSI-41 SMDPP) to the Web site.

209. The Web site acknowledges to the user that the VCR command was successfully executed.

EDGE/GPRS

Another instantiation of the AP may be to support the next generation of cellular/PCS standards such as EDGE and GPRS for wireless high-speed data access.

EDGE is based on the existing infrastructure (i.e., TIA/EIA-136 or GSM) using a high-speed modulation technology to achieve data transmission speeds of up to 384 Kbps. A subscriber can use the same dual-mode terminal for voice and data access at home, on the road, and in the office. The GPRS standard currently supports sending the voice calls over the voice (GSM or TIA/EIA-136) portion of the home network, while sending the data calls over the GPRS portion of the network. The GPRS nodes (Serving GPRS Support Node (SGSN) and Gateway GPRS Support Node (GGSN)) can be private to the EWCPS system or can interwork with the macrocellular GPRS nodes to support personal and private mobility.

IEEE 802.11b

Another instantiation of the AP can be to support a high-speed wireless data access via the IEEE 802.11b wireless LAN standard. This will enable the EWCSP for in-home networking services such as file sharing between home PCs, sharing of computing peripherals (e.g., printers and scanners), simultaneous high-speed Internet access, and home control features based on a 11 Mbps data rate. With QoS enhancements to IEEE 802.11b EWCSP can support value-added network service such as isochronous real-time voice and video telephony. The high-speed aspects of IEEE 802.11b enable more services such as remote viewing access to security surveillance cameras.

IEEE 802.11b may be used in conjunction with TIA/EIA-136 as illustrated in the functional block diagram of the AP. A subscriber can therefore answer a telephone call in their home on their wired telephone, TIA/EIA-136 handset, or on their IEEE 802.11b handset. EWCSP can also support interworking between IEEE 802.11b and GPRS nodes to support terminal and personal mobility between the home network and the public macrocellular GPRS network.

Some sample scenarios:

a. Remote Access to Home PC—From a subscriber's work place, the subscriber wants to access the Internet from their home PC. The subscriber should be able to connect from the office network to the service provider's Home Networking Web site and in turn to the subscriber's home network through the service provider's Home Networking VPN after appropriate authentication procedures. Once connected, the subscriber should be allowed to access all the home network resources including using the home PC to surf the Internet. In effect, the home terminal is emulated on the subscriber's office PC. Therefore, the entire service provider's network (via the service provider's broadband transport network and the service provider's broadband packet network) extending to a subscriber for accessing home network resources remotely becomes realistic and essential. Another service scenario is remote access to home PC for receiving a personal fax.

b. Using comparable procedures described above, a subscriber can remotely access and control:
   i. Home security systems, e.g., real-time viewing of security camera images of their house, and enabling/disabling of alarms.
   ii. Home appliances and electronics, e.g., adjusting thermostat setting, setting VCR, turning on the dishwasher.

Voice Call Implementation

Figure 3:
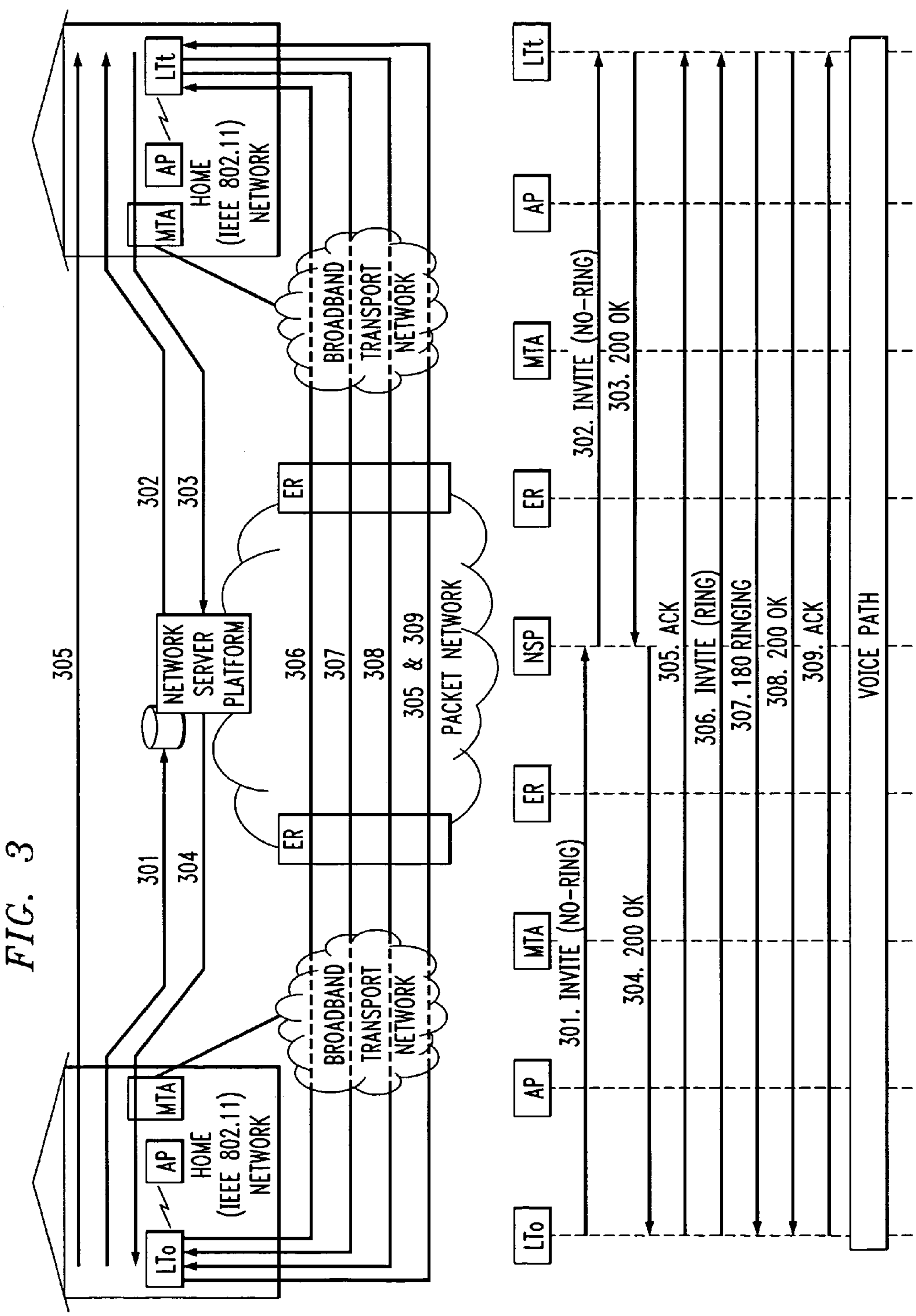
FIG. 3 is a combined schematic representation and flow chart for one embodiment of a voice call scheme in accordance with the present invention.

The following describes the basic service procedures including message exchanges for basic on-net voice calls in home networking services. FIG. 3 shows the basic SIP call flow from one laptop to another in the home networking service area. SIP is a proposed Internet standard for packet telephony from the IETF. The call flows in this section are for illustrative purposes only, and they are not meant to follow the exact message format of a specific call signaling standard. For example, an Origination or Call Origination message can be substituted for the INVITE message. Note: User's registration procedures to the network (i.e., NSP) are not illustrated; this is assumed to have occurred prior to the call. A sample registration procedure is illustrated in the data service scenario.

Typical steps implemented for a Voice Call Implementation are set forth in FIG. 3:

301. The user turns on the laptop and calls his friend using an IP address or DN. The Originating Laptop (LTo) generates an INVITE (no-ring) message and sends it to the NSP. Upon receiving the INVITE (no-ring) message, the NSP registers and authenticates/authorizes LTo for the service request.

302. The NSP maps the DN to an IP address, if needed, and confirms the location of the Terminating Laptop (LTt). The NSP generates an INVITE message and sends it to LTt.

303. Upon receiving the INVITE (no-ring), LTt determines if it can accommodate this call. If so, it generates a 200 OK response and sends it to the NSP.

304. Upon receiving the 200 OK message, the NSP forwards it to LTo. The NSP instructs the ERs that it has permission for the IP flow associated with this call. At this point the NSP has completed its transaction and does not maintain any more states for this call. The ERs take over the responsibility of maintaining, including billing, the call.

305. LTo sends an ACK message directly to LTt. This completes the three-way handshake for the INVITE (no-ring) exchange.

306. At this point, LTo attempts to reserve network resources to meet the QoS requirements of the call using such methods as Resource reSerVation Protocol (RSVP) or a priority-based method. If the resource reservation is successful, LTo sends an INVITE (ring) message directly to LTt.

307. Once LTt receives the INVITE (ring) message and successfully reserves network resources, it begins to generate RINGING to the destination user and sends a 180 RINGING message to LTo. LTo begins to play audible ringback tone to the calling user.

308. After the destination user answers the call, LTt sends a 200 OK message to LTo. LTt also begins to generate RTP packets of encoded voice and send them to LTo using the IP address and port number specified in the original INVITE (no-ring) message.

309. Upon receiving the 200 OK message, LTo responds with an ACK message. LTo plays the RTP stream that is received from LTt. LTo generates RTP packets of encoded voice and sends them to LTt using the IP address and port number specified in the original 200 OK message. The voice path is established in both directions. The associated ERs start to count the usage for billing purposes.

TIA/EIA-136 and SIP Interworking Voice Implementation

Figure 4:
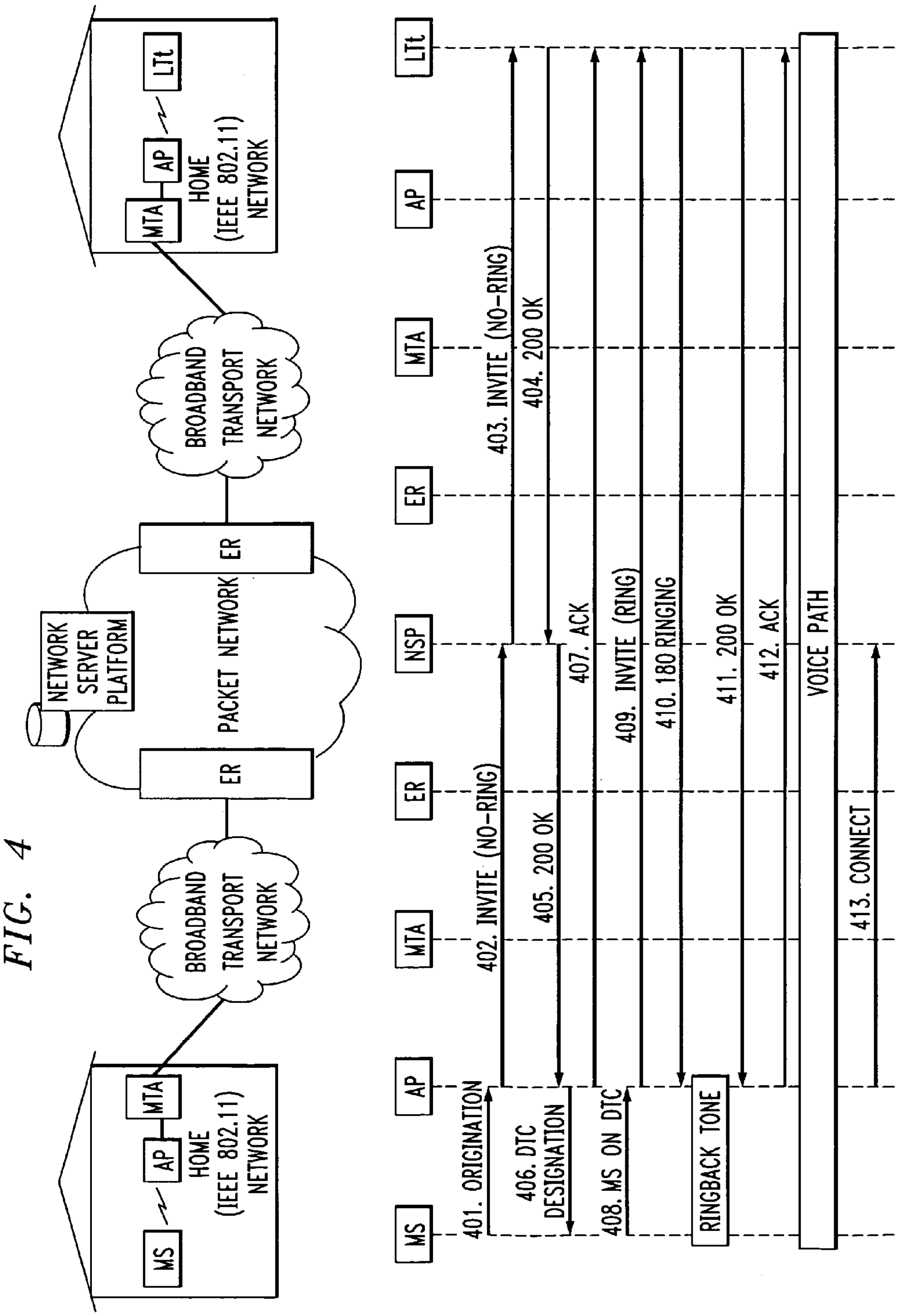
FIG. 4 is a combined schematic representation and flow chart for one embodiment of an interworking call scheme in accordance with the present invention.

The following describes the basic service procedures including message exchanges for basic on-net voice calls between a TIA/EIA-136 MS and a laptop for home networking services. FIG. 4 shows the basic TIA/EIA-136 and SIP interworking call flow from MS to a laptop both in home networking service areas. The call flows in this section are for illustrative purposes only, and they are not meant to follow the exact message format of a specific call signaling standard. Note: The MS and laptop registration procedures to the network (i.e., NSP) are not illustrated; these are assumed to have occurred prior to the call.

FIG. 4 shows one embodiment of steps for a scheme for TIA/EIA-136 and SIP Interworking Call Implementation:

401. The user calls his friend using a DN via his TIA/EIA-136 MS. (Note that the MS registration has previously occurred and is not illustrated here.) The MS sends a TIA/EIA-136 Origination message to the AP.

402. The AP in turn generates an INVITE (no-ring) message and sends it to the NSP.

403. The NSP first validates the MS and authorizes the MS for the service request. Then, the NSP maps the DN to an IP address, if needed, and determines the location of the Terminating Laptop (LTt). The NSP generates an INVITE (no ring) message and sends it to LTt.

404. Upon receiving the INVITE (no-ring), LTt determines if it can accommodate this call. If so, it generates a 200 OK response and sends it to the NSP.

405. Upon receiving the 200 OK message, the NSP forwards it to the AP. The NSP also instructs the ERs that it has permission for the IP flow associated with this call. At this point, the NSP has completed its transaction. The ERs take over the responsibility of maintaining, including billing, the call.

406. The AP allocates RF resources to the MS and informs the MS of the allocated RF traffic channel via the Digital Traffic Channel (DTC) Designation message.

407. Simultaneously, the AP sends an ACK message directly to LTt. This completes the three-way handshake for the INVITE (no-ring) exchange.

408. The MS informs the AP that it (MS) is tuned to the traffic channel via the MS on DTC notification.

409. The AP attempts to reserve network resources to meet the QoS requirements of the call using such methods as RSVP or a priority-based method. If the resource reservation is successful, the AP sends an INVITE (ring) message directly to LTt.

410. Once LTt receives the INVITE (ring) message and successfully reserves network resources, it begins to generate RINGING to the destination user and sends a 180 RINGING message to the AP. The AP begins playing an audible ringback tone to the calling user.

411. When the destination user answers the call, LTt sends a 200 OK message to the AP. LTt also begins to generate RTP packets of encoded voice and sends them to AP using the IP address and port number specified in the original INVITE (no-ring) message.

412. After receiving the 200 OK message, the AP responds with an ACK message to LTt. The AP transcodes the RTP stream that is received from LTt to the TIA/EIA-136 coding scheme, if needed, for playback to the MS user. It also transcodes, if needed, the TIA/EIA-136 voice packets to RTP packets of encoded voice, and sends them to LTt using the IP address and port number specified in the original 200 OK message. The voice path is established in both directions. The associated ERs starts to count the usage for billing purposes.

413. The AP sends a Connect message to the NSP for call detail purposes of the wireless portion of the call.

Data Service Implementation

Figure 5:
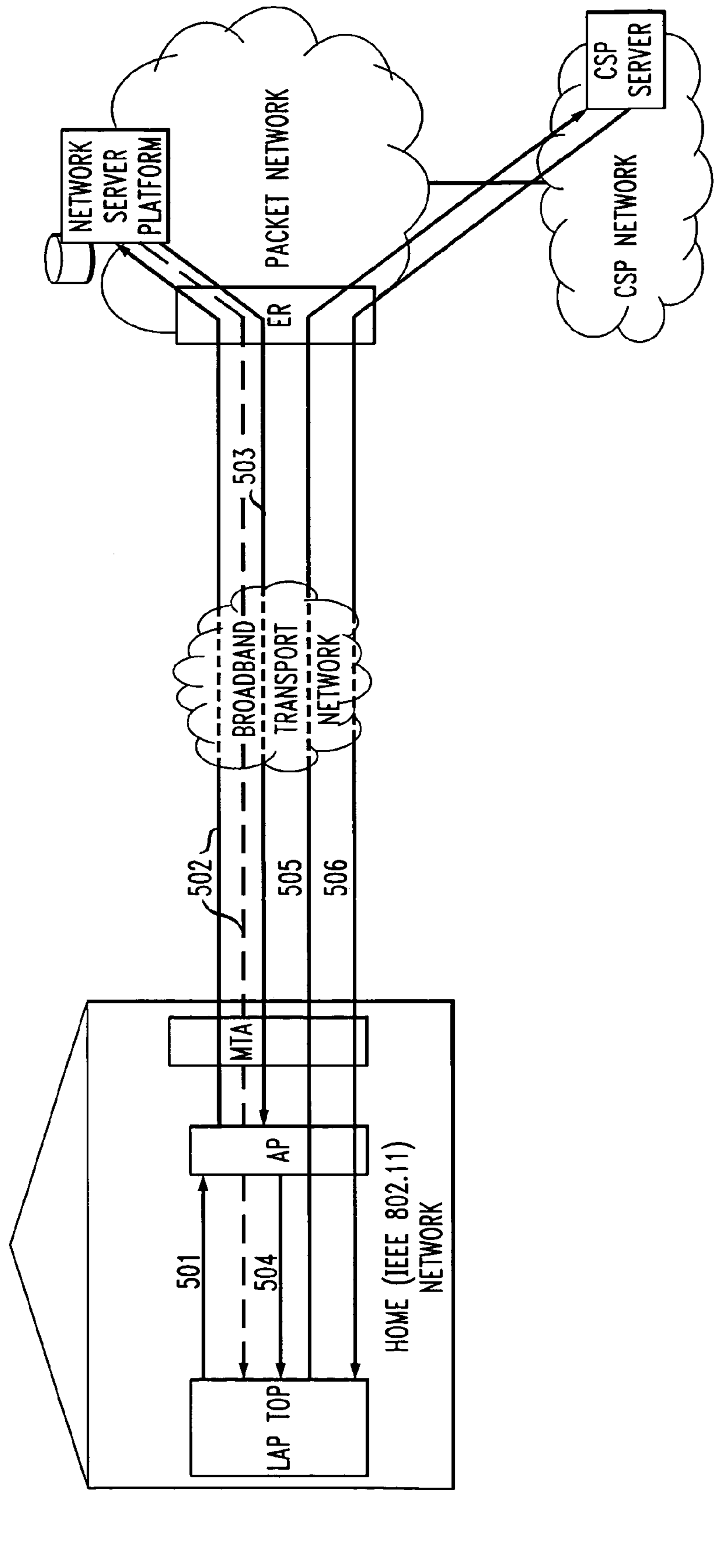
FIG. 5 is a schematic representation of one embodiment of a data services implementation in a home network in accordance with the present invention.

The following, as illustrated in FIG. 5, describes a basic data service implementation. The user accesses network services from his wireless station (e.g., laptop) at his home. He registers with his reach number, e.g., "handle", and the services will be charged to his network account. In addition, the user can register with any available content service providers (CSPs). The Packet Network provides the transport medium for the user, but any services rendered by other providers are transparent to this network.

FIG. 5 shows one embodiment of steps for an implementation for a Data Services in a Home Network:

501. The user powers up his laptop, and the laptop sends a Registration message to the AP. AP verifies that the laptop is valid for the home network.

502. AP forwards the message to NSP. As a security measure, the NSP can optionally invoke an authentication procedure with the user and/or laptop to verify the registration. If the authentication procedure fails, then the NSP ignores this registration, and the user is still considered as inactive.

503. After NSP accepts the user/laptop's registration, NSP responds with a Registration ACK to the AP.

504. The AP forwards the Registration ACK message to the laptop. The user can now start accessing/receiving all subscribed network services, including data services. The usage will be charged accordingly to their network account.

505. Optionally, if the user wants to access other CSPs for a special service, he may send the log-on request to the particular CSP server.

506. When the log-on request to the CSP is successful, the CSP allows the user to access its service(s). Any payment for these services is in addition to the fee charged by the home networking service provider.

Roaming Data Service Implementation

Figure 6:
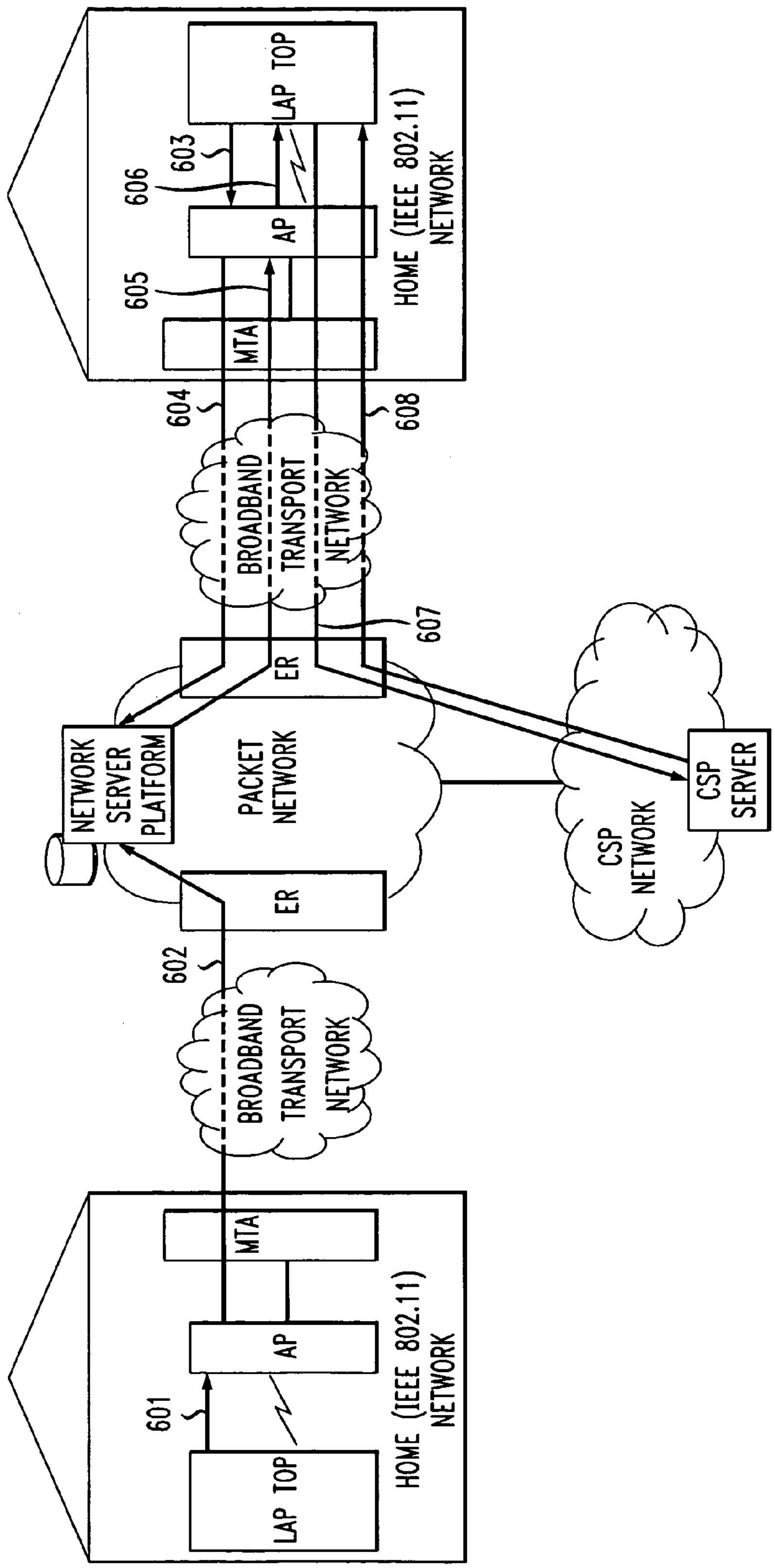
FIG. 6 is a schematic representation of one embodiment of a scheme for roaming to a visiting service area in accordance with the present invention.

As shown in FIG. 6, in the Roaming Data Service implementation, the user accesses network services from his wireless station (e.g., laptop) at his friend's home just as at his home. His reach number, e.g., "handle" remains the same, and the services will be charged to his home network account. This situation is similar to roaming in the cellular voice service. In addition, the user can register with any available content service providers.

FIG. 6 shows one embodiment of steps for a Roaming Data Service implementation:

601. The user powers down his laptop at home, and the laptop sends a De-registration message to the AP.

602. The AP forwards this message to the NSP. The NSP notes that the user (e.g., johndoe@homenetwork.com) is no longer active. Any incoming services for the user will be rejected or redirected to a default location (e.g., voicemail for an incoming telephone call).

603. The user visits his friend's home (that is also equipped with an IEEE 802.11 home networking service) and powers up his laptop. The laptop sends a Registration message to the visited AP, which verifies that the laptop is valid for the visiting home network.

604. The visited AP forwards the message to NSP. As a security measure, the NSP can optionally invoke an authentication procedure with the user and/or laptop to verify the registration. The NSP notes that the user is now active and associates the user/laptop (i.e., the handle, johndoe@homenetwork.com) with its new location. The NSP will direct any new incoming services for the user/laptop to the new location. If the authentication procedure fails, then the NSP ignores this registration, and the user is still considered as inactive.

605. After NSP notes the user/laptop's new location, NSP responds with a Registration Ack to the visited AP.

606. The visited AP forwards this message to the laptop. The user can now start accessing/receiving all subscribed network services in their friend's home, and will be charged accordingly to their own home network account.

607. Optionally, if the user wants to access other CSPs for a special service, he may send the log-on request to the particular CSP server.

608. When the log-on request to the CSP is successful, the CSP allows the user to access its service(s). Any payment for these services is in addition to the fee charged by the home networking service provider.

Using the above implementation, personal mobility can also be demonstrated when the user borrows his friend's laptop to access his own Home Network services from his friend's house. All network services will still be available to him based on the user's own account.

Description of the Access Equipment

The AP 102 is the wireless access point to the network. It can handle a variety of wireless protocols; TIA/EIA-136, GSM, GPRS/EDGE are illustrated here along with IEEE 802.11b. Note that any standard wireless protocols may be used. For example, the IEEE 802.15 (Bluetooth) standard may be used instead of IEEE 802.11b, and likewise any second-generation or third-generation protocol (e.g., CDMA, CDMA2000, WCDMA, etc.) may be used instead of TIA/EIA-136. Alternatively, depending on the implementation, the AP could also just support one wireless protocol. In one embodiment, the AP 102 may be connected to the MTA 104 via an Ethernet link or the AP and MTA may be one integrated unit. The following description discusses both types.

Separate AP and MTA

Where the AP and MTA are two separate units connected by an Ethernet link, the configuration offers the capability of connecting multiple APs (through a LAN) to support a large residence or a business environment to one MTA as its single cable access point. This also enables the AP and MTA vendors to be different.

Functional Block Description of the Access Point

Figure 7:
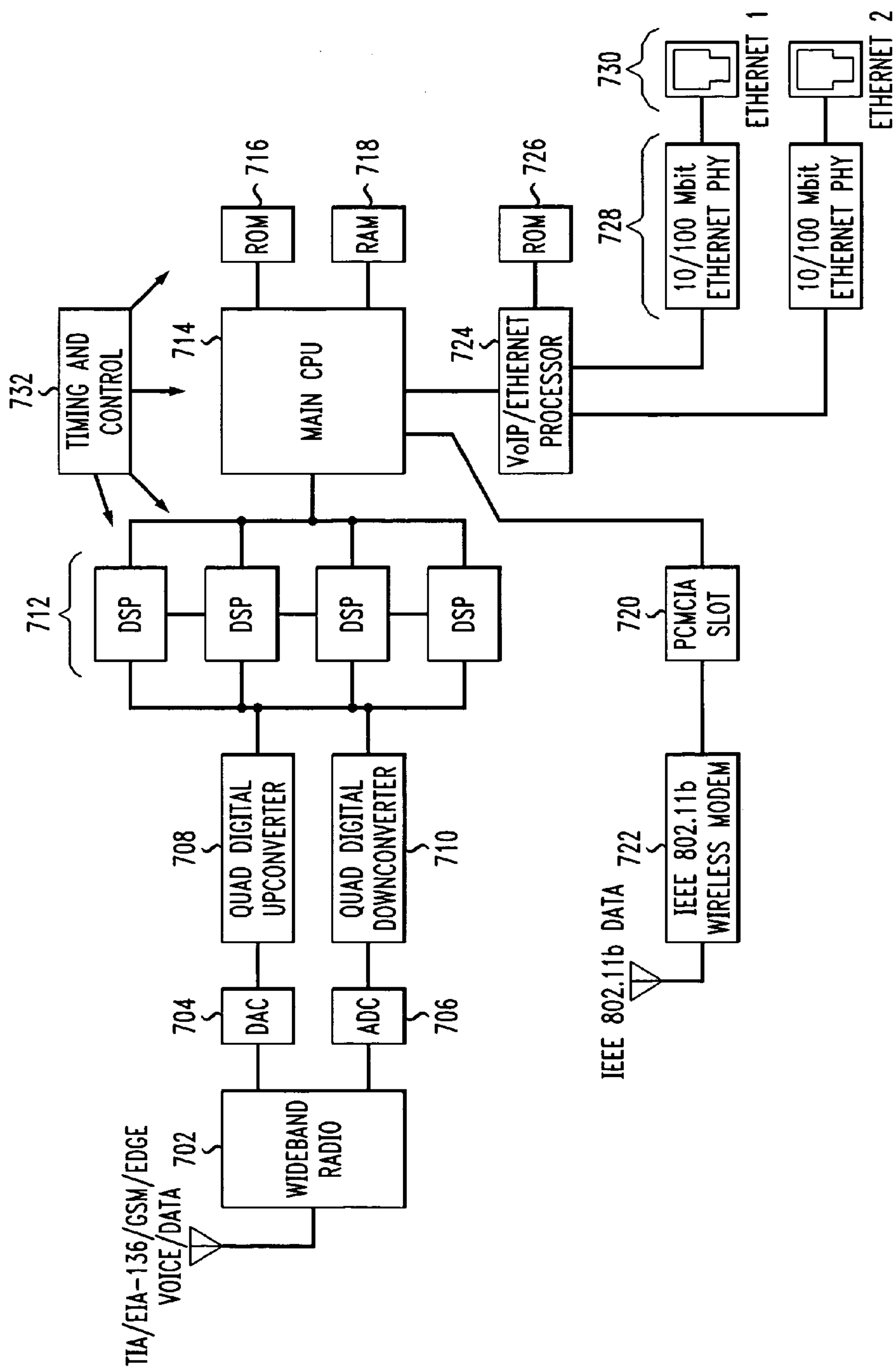
FIG. 7 is a block diagram of one embodiment of a wireless access point system for supporting a plurality of RF methods in accordance with the present invention.

FIG. 7 illustrates an exemplary embodiment of a wireless access point (AP) that can support at least one RF method such as TIA/EIA-136/GSM/EDGE and IEEE 802.11b. This diagram is for illustrative purposes; the AP may support any standard RF protocols such as IEEE 802.15 instead of IEEE 802.11b. The AP that is illustrated here supports three major interfaces through which voice and/or data may flow:

1. Ethernet interface for data and IP telephony data;

2. IEEE 802.11b wireless interface primarily for data based on the IEEE 802.11b standard but, with QoS enhancements, it is suitable for voice and entertainment distribution; and 3. Multichannel software radio interface for wireless data and voice communication with standard handsets that conform to TIA/EIA-136, GSM, EDGE, or other wireless protocols.

In FIG. 7 the voice or data is received by a wideband radio 702 that is in turn coupled to a DAC 704 and a ADC 706 that convert signals for a quad digital upconverter 708 and a quad digital downconverter 710, respectively, which are coupled to a plurality of digital signal processors (DSPs) 712. The DSPs 712 are coupled to a main central processing unit (CPU) 714 that includes ROM 716 and RAM 718 memory. The main computer can be replaced by an Application Specific Integrated Circuit (ASIC), a Field Programmable Gate Array (FPGA), a Reduced Instruction Set Computer (RISC) or any combination of the above, which may or may not include memory or other computer readable media separate from or integrated with the processing device, or any other similar device able to perform the functions described herein. The Timing and Control 732 provides for timing and control of the wireless access system. In addition, a PCMCIA slot 720 may be provided for the main CPU 714, where the PCMCIA slot 720 is coupled to a wireless modem 722 for receiving data. Also, a Voice over Internet Protocol (VoIP) or Ethernet Processor 724 may be coupled to the main CPU 714. Typically, the VoIP or Ethernet Processor 724 is coupled to at least a ROM 726 and may provide for Ethernet connectability using, for example, a 10/100 Mbit Ethernet PHY chip 728.

As shown in FIG. 7, the functions of each element of the AP typically include:

1. Wideband Radio 702: The wideband radio 702 provides a high dynamic range broadband signal from the antenna to the digital interface (ADC 706/DAC/704). The frequency band of operation is flexible and can consist of the 800 MHz cellular band and the 1900 MHz PCS band. Performance is sufficient to handle a range of radio standards including TIA/EIA-136, EDGE, GSM, CDPD, and analog cellular. The input to the wideband radio 702 is a broadband multi-carrier transmit IF signal from the DAC. The output from the wideband radio 702 is a downconverted broadband receive IF signal that is sent to the ADC 706.

2. DAC 704: The Digital-to-Analog Converter (DAC) 704 converts the digital representation of the transmit signal from the quad digital upconverter 708 into an analog waveform for the wideband radio 702.

3. ADC 706: The Analog-to-Digital Converter (ADC) 706 converts the receive output of the wideband radio 702 into a digital representation for the quad digital downconverter 710.

4. Quad digital upconverter 708: The quad digital upconverter 708 accepts up to four separate channels of baseband information as input and outputs a digital IF signal combining the four individual carriers. The device itself is responsible for providing flexible channel modulation types through programmable symbol types, symbol rates, and filtering.

5. Quad digital downconverter 710: The quad digital downconverter 710 performs similar functions to the upconverter 708, but for receive signals. The device input is a broadband digital signal that includes the channels of interest. The downconverter 710 selects the individual channels, filters them, and provides a baseband signal output to the DSPs 712.

6. DSP 712: The DSPs 712 are responsible for executing the desired radio protocol for each of the four channels. The individual DSP will take voice or data information from the Main CPU 714 and send it via the appropriate wireless protocol to the desired mobile device, while simultaneously forwarding mobile voice/data information to the Main CPU 714. While some of the wireless protocol is handled in the Main CPU 714, most of the protocol is performed in the DSPs 712 in order to provide a simpler API to wireless mobile devices.

7. Timing and Control 732: The timing and control complex 732 is a dedicated section of programmable logic that sets the appropriate timing for the wireless protocols, and provides a flexible hardware interface between the DSPs 712 and the upconverter 708/downconverter/710 (to allow load-sharing).

8. Main CPU 714: The main CPU 714 is primarily a router of information between the various semi-autonomous endpoints (wireless, IEEE 802.11b, and Ethernet). Packets of voice and data information received over the Ethernet interface are passed to the appropriate endpoint as desired by the user. Additionally, the main CPU 714 handles some of the higher-level protocol functions for these endpoints in order to assure quality of service is maintained throughout.

9. VoIP/Ethernet Processor 724: The VoIP/Ethernet Processor 724 manages the Ethernet interfaces. This device is actually a self-contained CPU with dedicated ROM, RAM, and interfaces. Its primary function is to handle IP voice conversion and encapsulation for the Ethernet, and wireless voice interfaces. The main CPU 714 controls this device and packets bound for the broadband transport interface (e.g., cable or XDSL) are also passed through the main CPU 714.

10. VoIP/Ethernet Processor ROM 726: Flash program memory for the VoIP Ethernet Processor 724.

11. Main CPU ROM 716: Flash program memory for the Main CPU 714.

12. Main CPU RAM 718: Program and data memory for the Main CPU 714.

13. 10/100 Mbit Ethernet PHY 728: The Ethernet PHY chip performs the analog modulation/demodulation functions necessary to connect the MAC functions within the VoIP/Ethernet Processor to an attached Ethernet device.

14. Ethernet port 730: RJ-45 Ethernet jack.

15. IEEE 802.11b wireless modem 722: The IEEE 802.11b wireless modem 722 is a PCMCIA device that attaches (through the PCMCIA slot interface) to the main CPU 714. The device handles wideband data communication with wireless laptop computers based on the IEEE 802.11b standard, and can be enhanced to provide QoS to these devices for streaming multimedia applications. Note that another standard type of wireless modem such as IEEE 802.15 can also be used.

16. PCMCIA slot 720: The PCMCIA slot 720 is a standard peripheral connection mechanism that allows the attachment of various peripheral devices to the main CPU. It is used here to interface with the IEEE 802.11b wireless modem. Note that this slot can also be used to interface with another standard type of wireless modem such as IEEE 802.15.

AP Signal Flow

The AP generally processes the signals from the three major interfaces:

a. TIA/EIA-136/GSM/EDGE: The radio circuitry, the DSPs 712, and the main CPU 714 process the signals from the TIA/EIA-136/GSM/EDGE wireless devices. The primary protocol-specific processes for the wireless interface are handled by the DSPs 712, while the data and voice information to/from the wireless device is forwarded to the main CPU 714 for routing. Depending on what communication is desired, the wireless voice/data may be routed to the Ethernet interface (for intranet telephony or data) or the IEEE 802.11b interface (intranet telephony or data).

b. IEEE 802.11b: Information flowing through the IEEE 802.11b interface may be IP telephony packets, streaming multimedia data, or regular internet/intranet data. The main CPU 714 establishes data priority and ensures QoS to the wireless client, so all data is passed through it. Data to/from the IEEE 802.11b interface may be routed to the Ethernet interface (for intranet telephony or data) or the TIA/EIA-136/GSM/EDGE interface for wireless telephony or data.

c. Ethernet: The Ethernet interface provides a wired connection for MTA, computers, and IP telephony devices. As Ethernet does not currently support QoS, this is primarily seen as a data interface. Data from this interface is passed to the main CPU 714 and can be routed to other endpoints in the system (TIA/EIA-136/GSM/EDGE, IEEE 802.11b, or the other Ethernet interfaces) or passed through the broadband transport interface (e.g., cable or xDSL) on the MTA to the Internet.

Figure 8:
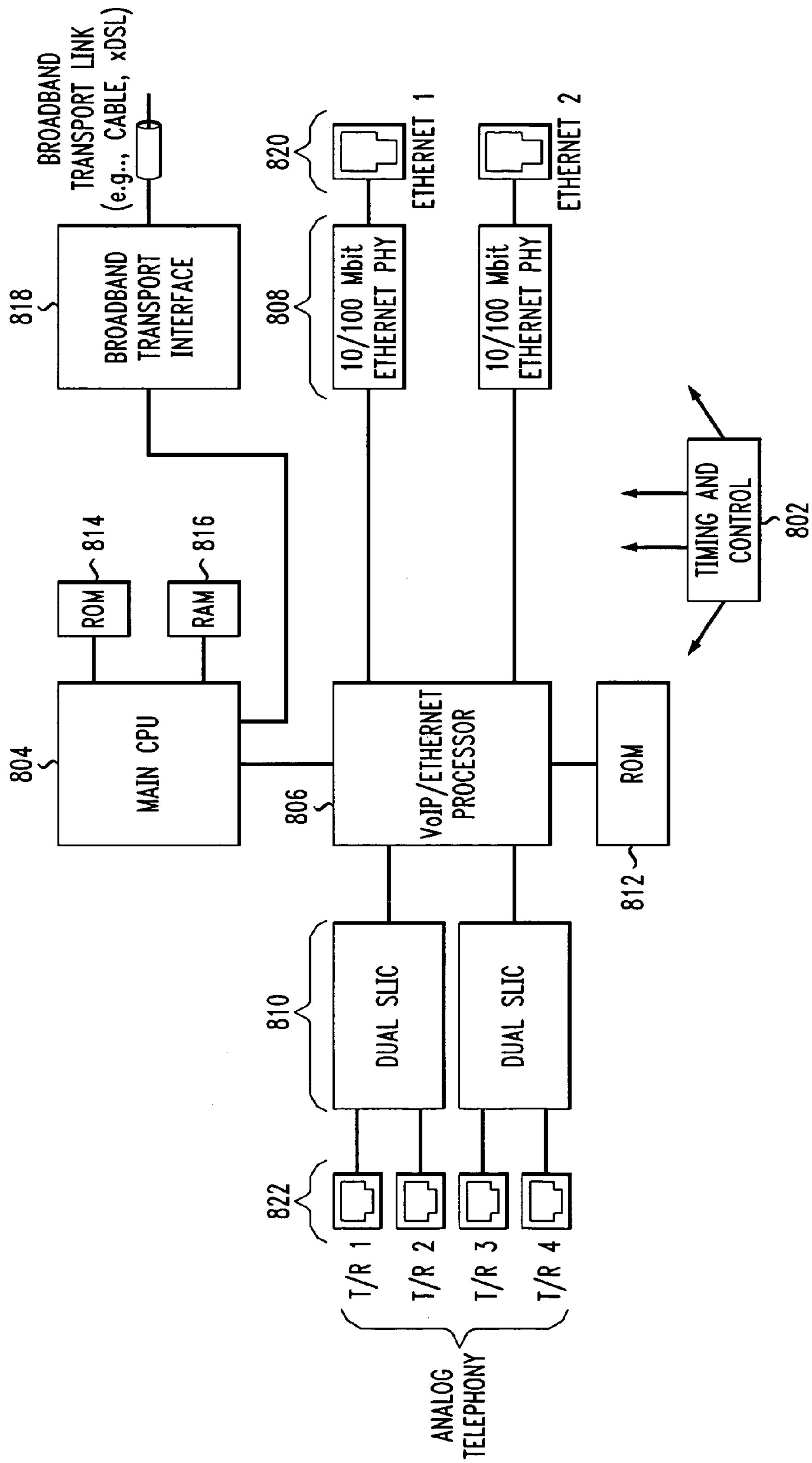
FIG. 8 is a functional block diagram showing one embodiment of functions for a Media Terminal Adapter (MTA) in accordance with the present invention.

FIG. 8 illustrates one embodiment of a Functional Block Description of the MTA.

Typically, there are three major interfaces through which voice and/or data may flow:

1. Broadband transport interface (e.g., cable, xDSL, etc) supporting entertainment, data, video, and voice;

2. Ethernet interface for data and IP telephony data;

3. Analog telephony interface for analog voice communications.

The MTA connects to the service provider's broadband transport network (e.g., HFC plant, xDSL, etc) via the broadband transport interface (e.g., cable, xDSL, etc) and connects to the AP via an Ethernet interface. The service provider's broadband packet network distributes the services through the MTA and the AP to the end devices.

Typically, the functions of the elements of the MTA include:

1. Timing and Control 802: The timing and control complex 802 is a dedicated section of programmable logic that sets the appropriate timing and control for the protocols and for all the other elements.

2. Main CPU 804: The main CPU 804 is primarily a router of information between the various semi-autonomous endpoints (broadband transport interface, Ethernet, and analog telephony). Packets of voice and data information received over the broadband transport interface are passed to the appropriate endpoint as desired by the user. Additionally, the main CPU handles some of the higher-level protocol functions for these endpoints in order to assure quality of service is maintained throughout.

3. VoIP/Ethernet Processor 806: The VoIP/Ethernet Processor 806 manages the Ethernet 808 and Subscriber's Line Interface Circuit (SLIC) 810 interfaces. This device is actually a self-contained CPU with dedicated ROM, RAM, and interfaces. Its primary function is to handle IP voice conversion and encapsulation for the Ethernet, and analog telephony interfaces. The main CPU 804 controls the VoIP/Ethernet Processor 806, and packets bound for the broadband transport interface are also passed through the main CPU 804. The main computer can be replaced by an Application Specific Integrated Circuit (ASIC), a Field Programmable Gate Array (FPGA), a Reduced Instruction Set Computer (RISC) or any combination of the above, which may or may not include memory or other computer readable media separate from or integrated with the processing device, or any other similar device able to perform the functions described herein.

4. VoIP/Ethernet Processor ROM 812: Flash program memory for the VoIP Ethernet Processor 8.06

5. Main CPU ROM 814: Flash program memory for the Main CPU 804.

6. Main CPU RAM 816: Program and data memory for the Main CPU 804.

7. Broadband Transport Interface 818: The Broadband transport interface 818 utilizes a broadband transport link such as cable or xDSL to connect the main CPU 804 to the service provider's network (e.g., DOCSIS 1.1 CMTS in the cable head-end for the HFC transport network). The chipset that performs this function handles modulation, demodulation, error correction, and framing compatible with the transport standard, e.g., DOCSIS.

8. 10/100 Mbit Ethernet PHY 808: The Ethernet PHY chip 808 performs the analog modulation/demodulation functions necessary to connect the MAC functions within the VoIP/Ethernet Processor 806 to an attached Ethernet device.

9. Ethernet port 820: RJ-45 Ethernet jack.

10. Dual SLIC 810: The Dual SLIC circuits 810 interface digital $\mu$-law coded audio to standard tip/ring telephones. These interfaces are useful for providing connections to legacy analog telephony devices.

11. T/R port 822: Standard RJ-11 Telephone jack to interface with analog telephone sets.

MTA Signal Flow

This section describes how the signals from the three major interfaces are processed by the MTA:

a. T/R interface 822: The tip/ring interface 822 is strictly a voice interface. IP voice packets (processed by the VoIP/Ethernet Processor 806) to/from this interface may be forwarded to any of the other interfaces (broadband transport or Ethernet) via the main CPU 804.

b. Broadband transport interface 818: The broadband transport interface 818 is the primary path for backhaul of data and voice packets. The equipment in the service provider's broadband packet network (e.g., the CMTS in the cable head-end) will provide voice and data connections to the Internet and PSTN. Note that for the cable-based broadband transport interface for the HFC plant, QoS over this interface is controlled by the DOCSIS standard and overseen by the main CPU. Data from the broadband transport interface may be selectively routed to the other interfaces.

c. Ethernet interface 808: The Ethernet interface 808 provides a wired connection for AP, computers, and IP telephony devices. As Ethernet does not currently support QoS, this is primarily seen as a data interface. Data from this interface is passed to the main CPU and can be routed to other endpoints in the system, or passed through the broadband transport interface to the Internet.

Intelligent Broadband Access Point (IBAP) (AP Integrated with the MTA)

Figure 9:
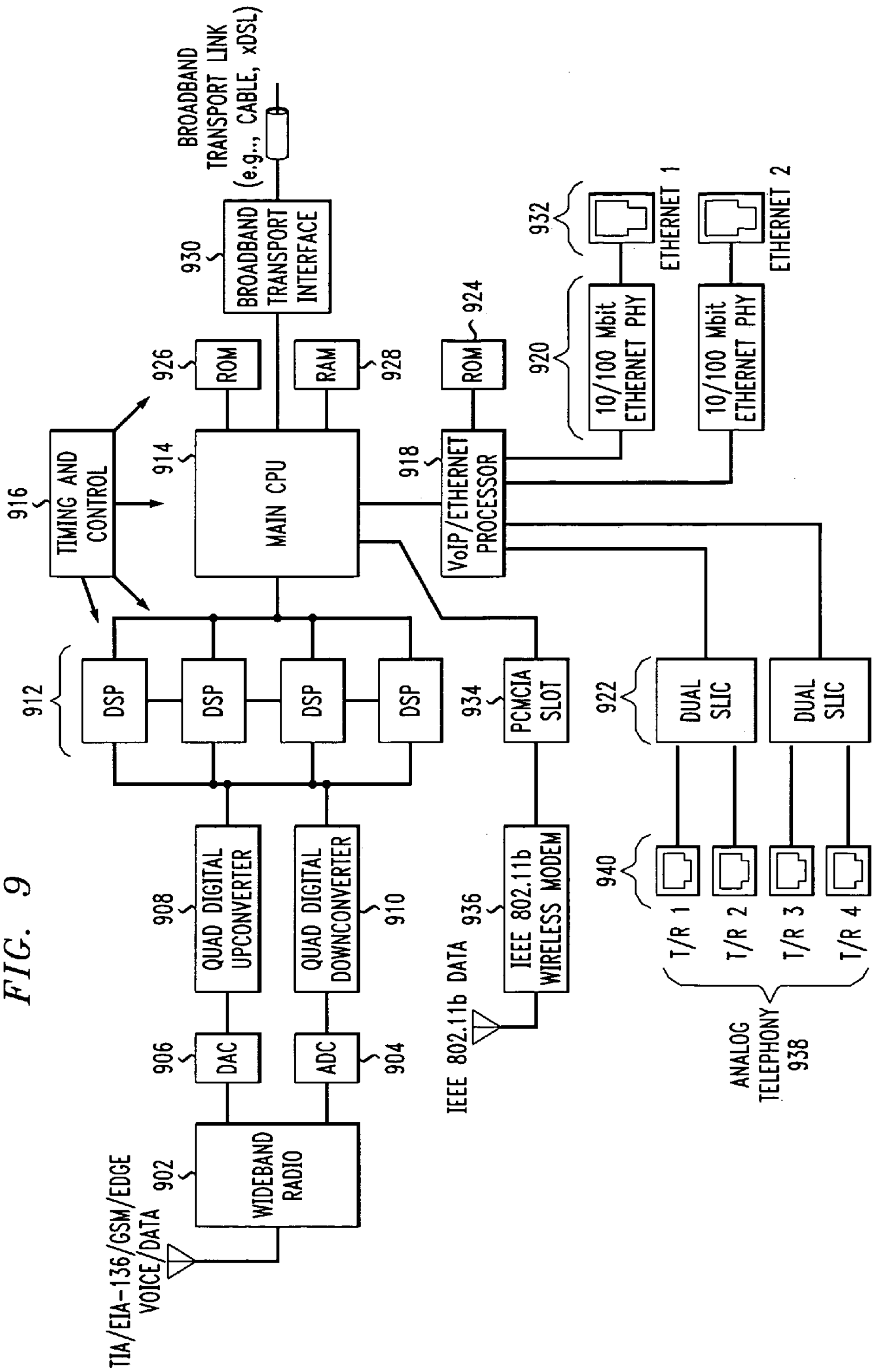
FIG. 9 is a functional block diagram showing one embodiment of an Intelligent Broadband Access Point unit (IBAP) in accordance with the present invention.

As shown in the functional block diagram in FIG. 9, the Intelligent Broadband Access Point (IBAP) is an AP that is integrated with the MTA. FIG. 9 depicts an exemplary embodiment of an IBAP. This integrated unit may be useful in a residence or SOHO environment that can be adequately serviced by a single wireless access point.

The IBAP supports five major interfaces through which voice and/or data may flow:

1. Broadband transport interface (e.g., cable, xDSL, etc) supporting entertainment, data, video, and voice;

2. Ethernet interface for data and IP telephony data;

3. Analog telephony interface for analog voice communications;

4. IEEE 802.11b wireless interface primarily for data based on the IEEE 802.11b standard, but with QoS enhancements it is suitable for voice and entertainment distribution;

5. Multichannel software radio interface for wireless data and voice communication with standard handsets that conform to TIA/EIA-136, GSM, EDGE, or other wireless protocols.

The typical functions of the elements of the IBAP (an AP Integrated with the MTA), as illustrated in FIG. 9, include:

1. Wideband Radio 902: The wideband radio 902 provides a high dynamic range broadband signal from the antenna to the digital interface (ADC 904/DAC/906). The frequency band of operation is flexible and can consist of the 800 MHz cellular band and the 1900 MHz PCS band. Performance is sufficient to handle a range of radio standards including TIA/EIA-136, EDGE, CDMA, WCDMA, CDMA2000, GSM, CDPD, and analog cellular. The input to the wideband radio is a broadband multi-carrier transmit IF signals from the DAC 906. The output from the wideband radio is a downconverted broadband receive IF signal that is sent to the ADC 904.

2. DAC 906: The Digital-to-Analog Converter (DAC) 906 converts the digital representation of the transmit signal from the Quad digital upconverter 908 into an analog waveform for the wideband radio 902.

3. ADC 904: The Analog-to-Digital Converter (ADC) 904 converts the receive output of the wideband radio 902 into a digital representation for the Quad digital downconverter 910.

4. Quad digital upconverter 908: The quad digital upconverter 908 accepts up to four separate channels of baseband information as input and outputs a digital IF signal combining the four individual carriers. The device itself is responsible for providing flexible channel modulation types through programmable symbol types, symbol rates, and filtering.

5. Quad digital downconverter 910: The quad digital downconverter 910 performs similar functions to the upconverter 908, but for receive signals. The device input is a broadband digital signal that includes the channels of interest. The downconverter 910 selects the individual channels, filters them, and provides a baseband signal output to the DSPs 912.

6. DSPs 912: The DSPs 912 are responsible for executing the desired radio protocol for each of the four channels. The individual DSP will take voice or data information from the Main CPU 914 and send it via the appropriate wireless protocol to the desired mobile device, while simultaneously forwarding mobile voice/data information to the Main CPU 914. While some of the wireless protocol is handled in the Main CPU 914, most is done in the DSPs 912 in order to provide a simpler API to wireless mobile devices.

7. Timing and Control 916: The timing and control complex 916 is a dedicated section of programmable logic that sets the appropriate timing for the wireless protocols, all the other elements, and provides a flexible hardware interface between the DSPs 912 and the upconverter 908/downconverter 910 (to allow load-sharing).

8. Main CPU 914: The main CPU 914 is primarily a router of information between the various semi-autonomous endpoints (broadband transport interface, wireless, IEEE 802.11b, Ethernet, and analog telephony). Packets of voice and data information received over the broadband transport interface are passed to the appropriate endpoint as desired by the user. Additionally, the main CPU 914 handles some of the higher-level protocol functions for these endpoints in order to assure quality of service is maintained throughout.

9. VoIP/Ethernet Processor 918: The VoIP/Ethernet Processor 918 manages the Ethernet 920 and SLIC 922 interfaces. This device is actually a self-contained CPU with dedicated ROM, RAM, and interfaces. Its primary function is to handle IP voice conversion and encapsulation for the Ethernet, wireless voice, and analog telephony interfaces. The main CPU controls this device and packets bound for the broadband transport interface are also passed through the main CPU. The main computer can be replaced by an Application Specific Integrated Circuit (ASIC), a Field Programmable Gate Array (FPGA), a Reduced Instruction Set Computer (RISC) or any combination of the above, which may or may not include memory or other computer readable media separate from or integrated with the processing device, or any other similar device able to perform the functions described herein.

10. VoIP/Ethernet Processor ROM 924: Flash program memory for the VoIP Ethernet Processor 918.

11. Main CPU ROM 926: Flash program memory for the Main CPU 914.

12. Main CPU RAM 928: Program and data memory for the Main CPU 914.

14. Broadband transport interface 930: The broadband transport interface 930 utilizes a broadband transport link such as cable or xDSL to connect the main CPU 914 to the service provider's network (e.g., DOCSIS 1.1 CMTS in the cable head-end for the HFC transport network). The chipset that performs this function handles modulation, demodulation, error correction, and framing compatible with the appropriate standard (e.g., DOCSIS).

15. 10/100 Mbit Ethernet PHY 920: The Ethernet PHY chip 920 performs the analog modulation/demodulation functions necessary to connect the MAC functions within the VoIP/Ethernet Processor 918 to an attached Ethernet device.

16. Ethernet port 932: RJ-45 Ethernet jack.

17. IEEE 802.11b wireless modem 936: the IEEE 802.11b wireless modem 936 is a PCMCIA device that attaches (through the PCMCIA slot interface 934) to the main CPU 914. The device handles wideband data communication with wireless laptop computers based on the IEEE 802.11b standard, and can be enhanced to provide QoS to these devices for streaming multimedia applications. Note that another type of standard wireless modem such as IEEE 802.15 can also be used.

18. PCMCIA slot 934: The PCMCIA slot 934 is a standard peripheral connection mechanism that allows the attachment of various peripheral devices to the main CPU 914. It is used here to interface with the IEEE 802.11b wireless modem 936. Note that this slot can also be used to interface with any standard wireless modem such as an IEEE 802.15 wireless modem.

19. Dual SLIC 922: The Dual SLIC circuits 922 interface digital u-law coded audio to standard tip/ring telephones 938. These interfaces are useful for providing connections to legacy analog telephony devices.

20. T/R port 940: Standard RJ-11 Telephone jack to interface with analog telephone sets.

IBAP Signal Flow

Signals from the five major interfaces are typically processed by the IBAP as follows:

a. TIA/EIA-136/GSM/EDGE 942: the radio circuitry, the DSPs 912, and the main CPU 914 process the signals from the TIA/EIA-136/GSM/EDGE wireless devices. The DSPs 912 handle the primary protocol-specific processing for the wireless interface, while the data and voice information to/from the wireless device is forwarded to the main CPU 914 for routing. Depending on what communication is desired, the wireless voice/data may be routed to the broadband transport interface (for IP telephony or data), the Ethernet interface (for intranet telephony or data), the analog telephony interface ("local call"), or the IEEE 802.11b interface (intranet telephony or data).

b. IEEE 802.11b: Information flowing through the IEEE 802.11b interface may be IP telephony packets, streaming multimedia data, or regular internet/intranet data. The main CPU 914 establishes data priority and ensures QoS to the wireless client, so all data is passed through it. Data to/from the IEEE 802.11b interface may be routed to any of the other interfaces, TIA/EIA-136/GSM/EDGE (for wireless telephony or data), broadband transport interface (for IP telephony or data), Ethernet interface (for intranet telephony or data, or the analog telephony interface ("local calls").

c. T/R 940: The tip/ring interface is strictly a voice interface. IP voice packets to/from this interface may be forwarded to any of the other interfaces (TIA/EIA-136/GSM/EDGE, IEEE 802.11b, broadband transport interface or Ethernet) via the main CPU 914.

d. Broadband transport interface 930: The broadband transport interface 930 is the primary path for backhaul of data and voice packets. The equipment in the service provider's broadband packet network (e.g., CMTS in the cable head-end for a HFC transport network) will provide voice and data connections to the Internet and PSTN. Note that for a HFC transport network, the QoS over this interface is controlled by the DOCSIS standard and overseen by the main CPU. Data from the broadband transport interface may be selectively routed to the other interfaces.

e. Ethernet interface 920: The Ethernet interface 920 provides a wired connection for computers and IP telephony devices. As Ethernet does not currently support QoS, this is primarily seen as a data interface. Data from this interface is passed to the main CPU 914 and can be routed to other endpoints in the system, or passed through the broadband transport interface 930 to the Internet.

Although the present invention has been described in relation to particular preferred embodiments thereof, many variations, equivalents, modifications and other uses will become apparent to those skilled in the art. It is preferred, therefore, that the present invention be limited not by the specific disclosure herein, but only by the appended claims.

What is claimed is:

1. A method for network-centric service distribution that integrates a wireless access service in a local environment through the use of a local Residential/Business Broadband Network (RBN) to a service provider's transport network and to a service provider's broadband packet network that facilitates end-to-end packet telecommunication services, comprising the steps of:

providing access functions for connecting said service provider's broadband packet network to the RBN via said service provider's broadband transport network, wherein said RBN is coupled to said service provider's broadband transport network using either one of a Hybrid Fiber Coax (HFC) cable system and a generic Digital Subscriber Line (xDSL); and providing call and service termination functions to a plurality of local RBN devices by a Media Terminal Adapter (MTA) connected and coupled to an access port (AP) said access port comprising a miniaturized radio base station for establishing analog and digital communication channels with said plurality of wireless local RBN devices.

2. A method for network-centric service distribution that integrates a wireless access service in a local environment through the use of a local Residential/Business Broadband Network (RBN) to a service provider's transport network and to a service provider's broadband packet network that facilitates end-to-end packet telecommunication services, comprising the steps of:

providing access functions for connecting said service provider's broadband packet network to the RBN via said service provider's broadband transport network, wherein said RBN is coupled to said service provider's broadband transport network using either one of a Hybrid Fiber Coax (HFC) cable system and a generic Digital Subscriber Line (xDSL); and providing call and service termination functions to a plurality of local RBN devices by a Media Terminal Adapter (MTA) connected and coupled to an access port (AP) the connection between said access port and said Media Terminal Adapter is an Ethernet interface.

3. A method for network-centric service distribution that integrates a wireless access service in a local environment through the use of a local Residential/Business Broadband Network (RBN) to a service provider's transport network and to a service provider's broadband packet network that facilitates end-to-end packet telecommunication services, comprising the steps of:

providing access functions for connecting said service provider's broadband packet network to the RBN via said service provider's broadband transport network, wherein said RBN is coupled to said service provider's broadband transport network using either one of a Hybrid Fiber Coax (HFC) cable system and a generic Digital Subscriber Line (xDSL); and providing call and service termination functions to a plurality of local RBN devices by a Media Terminal Adapter (MTA) connected and coupled to an access port (AP) said access port communicates with said plurality of wireless local RBN devices via at least one of: TIA/EIA-136 standards, Enhanced Data for Global Evolution (EDGE)/General Packet Radio Service (GPRS) standards, IEEE 802.11b standards, Global System for Mobile Communications (GSM), IS-95, IEEE 802.15, Cellular Digital Packet Radio (CDPD), Call Division Multiple Access (CDMA), CDMA2000, Wideband CDMA (WCDMA), Personal Handyphone System (PHS) and IS-95 High Data Rate (HDR).

4. A method for network-centric service distribution that integrates a wireless access service in a local environment through the use of a local Residential/Business Broadband Network (RBN) to a service provider's transport network and to a service provider's broadband packet network that facilitates end-to-end packet telecommunication services, comprising the steps of:

providing access functions for connecting said service provider's broadband packet network to the RBN via said service provider's broadband transport network, wherein said RBN is coupled to said service provider's broadband transport network using either one of a Hybrid Fiber Coax (HFC) cable system and a generic Digital Subscriber Line (xDSL); and providing call and service termination functions to a plurality of local RBN devices by a Media Terminal Adapter (MTA) connected and coupled to an access port (AP) said access port communicates with said plurality of wireless local RBN devices via at least one of a standardized air interface used for analog, digital, circuit, and packet communications to narrowband and broadband wireless devices, computing-telephony resources and appliances.

5. A method for network-centric service distribution that integrates a wireless access service in a local environment through the use of a local Residential/Business Broadband Network (RBN) to a service provider's transport network and to a service provider's broadband packet network that facilitates end-to-end packet telecommunication services, comprising the steps of:

providing access functions for connecting said service provider's broadband packet network to the RBN via said service provider's broadband transport network, wherein said RBN is coupled to said service provider's broadband transport network using either one of a Hybrid Fiber Coax (HFC) cable system and a generic Digital Subscriber Line (xDSL);

providing a call and service termination functions to a plurality of local wireless RBN devices;

sending instructions and information from a device in communication with said service provider's broadband packet network via said service provider's broadband transport network to said Media Terminal Adapter coupled to said access port to said plurality of wireless local RBN devices; and distributing instructions and information including call features and related Operation, Administration and Maintenance (OA&M) instructions via a communication link between said access port and said plurality of wireless local RBN devices.

6. The method according to claim 5, further comprising the step of said device in communication with said service provider's broadband packet network receiving information from said plurality of wireless local RBN devices via said communication link between said plurality of wireless local RBN devices and said access port via said communication link between said access port and said Media Terminal Adapter via said service provider's broadband transport network via said service provider's broadband packet network.

7. A method for network-centric service distribution that integrates a wireless access service in a local environment through the use of a local Residential/Business Broadband Network (RBN) to a service provider's transport network and to a service provider's broadband packet network that facilitates end-to-end packet telecommunication services, comprising the steps of:

providing access functions for connecting said service provider's broadband packet network to the RBN via said service provider's broadband transport network, wherein said RBN is coupled to said service provider's broadband transport network using either one of a Hybrid Fiber Coax (HFC) cable system and a generic Digital Subscriber Line (xDSL); and providing call and service termination functions to a plurality of local RBN devices by a Media Terminal Adapter (MTA) connected and coupled to an access port (AP), said access port communicates with said plurality of wireless local RBN devices via at least one of: TIA/EIA-136 standards, Enhanced Data for Global Evolution (EDGE)/General Packet Radio Service (GPRS) standards, IEEE 802.11b standards, Global System for Mobile Communications (GSM), IS-95, IEEE 802.15, Cellular Digital Packet Radio (CDPD), Call Division Multiple Access (CDMA), CDMA2000, Wideband CDMA (WCDMA), Personal Handyphone System (PHS) and IS-95 High Data Rate (HDR), wherein said wireless local RBN devices use TIA/EIA-136 standards to communicate via a short message service.

8. A computer-readable medium having computer-executable instructions for remotely accessing a Residential/Business Broadband Network (RBN), wherein the computer-executable instructions are executed on a processor and comprise the steps of:

accessing the RBN of the subscriber;

communicating, after an authentication procedure, with the broadband home network of the subscriber to send a message to a device equipped with a wireless radio;

preparing and second, by an associated server, a command for the device to a network server platform (NSP);

translating, by the NSP, the command into the message;

retrieving, by the NSP, an Internet protocol (IP) address for an access port (AP) of the subscriber's RBN;

wrapping the message in an IP message;

sending the IP message to the AP;

receiving, by the AP, the IP message;

extracting the message;

sending the message to the device;

receiving the message by the device;

executing the command; and where desired, notifying the subscriber of successful delivery of the message.

9. The computer-readable medium, according to claim 8, wherein the step of notifying the subscriber of successful delivery of the message comprises the steps of:

sending, by the device, an acknowledgement message;

receiving, by the AP, the acknowledgement message;

retrieving, by the AP, the IP address of the NSP;

wrapping, by the AP, the acknowledgement message in a second IP message;

forwarding the second IP message to the NSP;

translating, by the NSP, the acknowledgement message into a command acknowledgement message;

forwarding, by the NSP, the command acknowledgement message to the associated server; and sending, by the NSP, the command acknowledgement message to the subscriber that the command for the device was successfully executed.

10. The computer-readable medium according to claim 8, wherein all non-IP messages are in short message format.

11. The computer-readable medium according to claim 6, wherein transcoding, by the AP, the stream that is received from the LTt to the TIA/EIA-136 coding scheme, if needed, for playback to the MS user and transcoding, if needed, the TIA/Eia-136 voice packets to packets of encoded voice, and sending them to the LTt using the IP address and port number specified in the 200 OK message, establishes the voice path in both directions.

12. A computer-readable medium having computer-executable instructions for remotely implementing a message exchange between a first subscriber's Residential/Business Broadband Network (RBN) and a second subscriber's RBN, wherein the computer-executable instructions are executed on a processor and comprise the steps of:

activating, by an originating user, a generating portable computer and calling a terminating computer using one of an IP address and a directory number (DN);

generating, by the originating user, a first call origination-no-ring message and sending the first call origination-no-ring message to a network server platform (NSP);

upon receiving the first call origination-no-ring message, registering by the NSP;

mapping, where needed, by the NSP, the DN to the IP address, and confirming a location of the terminating computer;

generating, by the NSP, a second call origination-no-ring message for the terminating computer and sending the second call origination-no-ring message to the terminating computer;

upon receiving the second call origination-no-ring message, determining by the terminating computer if a call can be completed and, where the call can be completed, generating an OK message and sending the OK message to the NSP;

upon receiving the OK message, forwarding, by the NSP, the OK message to the generating portable computer, instructing, by the NSP, a service provider's broadband transport network and a service provider's broadband packet network that the NSP has permission for an IP flow associated with the call;

sending an acknowledgement, by the generating portable computer, to the terminating computer;

requesting to reserve network resources, by the generating portable computer, to meet quality of service (QoS) requirements of the call;

where said request to reserve network resources is successful, sending, by the generating portable computer, a call origination-ring message directly to the terminating computer;

upon the terminating computer's receiving the call origination-ring message and successfully reserving network resources, generating RINGING to the generating portable computer and sending a RINGING message to the generating portable computer;

playing, by the generating portable computer, an audible ringback tone to the originating user;

upon the terminating computer's answering the call, sending, by the terminating computer, a second OK message to the generating portable computer;

generating, by the terminating computer, packets of encoded voice and sending the packets in a first stream to the generating portable computer using the IP address and port number specified in the first call origination (no-ring) message;

upon receiving the second OK message, responding, by the generating portable computer, with an ACK message;

playing, by the generating portable computer, the received first stream; and generating, by the generating portable computer, packets of encoded voice and sending the packets in a second stream to the terminating computer using the IP address and port number specified in the second OK message to establish a voice path in both directions.

13. A computer-readable medium having computer-executable instructions for remotely implementing a message exchange using a Telecommunications Industry Association and Electronic Industries Alliance (TIA/EIA)-136 standard and Internet Engineering Task Force (IETF) Session Initiation Protocol (SIP) call flow from a Mobile Station (MS) using a Residential/Business Broadband Network (RBN) to a laptop using a second RBN, wherein the computer-executable instructions are executed on a processor and comprise the steps of:

initiating a call, by a calling user to a destination user (callee), using a directory number (DN) of said callee via said calling user's TIA/EIA-136 mobile station (MS) where MS registration has previously occurred and where the MS sends a TIA/EIA-136 Origination message to an access port (AP);

generating, by the AP, an INVITE-no-ring message and sending the INVITE-no-ring message to a network server platform (NSP);

validating, by the NSP, the MS and authorizing the MS for a service request;

mapping, by the NSP, the DN to an Internet Protocol (IP) address, if needed, and determining a location of a Terminating Laptop (LTt) for the callee;

generating, by the NSP an INVITE-no-ring message and sending the INVITE-no-ring message to the LTt;

upon receiving the INVITE-no-ring message, determining, by the LTt, if the LTt can accommodate the call and, if so, generating a 200 OK response and sending the 200 OK response to the NSP;

upon receiving the 200 OK message, forwarding, by the NSP, the 200 OK message to the AP and instructing a service provider's broadband transport network and a service provider's broadband packet network that the NSP has permission for IP flow associated with the call;

allocating, by the AP, RF resources to the MS and informing the MS of an allocated RF traffic channel via a Digital Traffic Channel (DTC) Designation message while the AP is sending an ACK message directly to the LTt;

informing, by the MS, to the AP that the MS is tuned to the allocated traffic channel via the MS on DTC notification;

attempting, by the AP, to reserve network resources to meet QoS requirements of the call and, if network resource reservation is successful, sending, by the AP, an INVITE-ring message directly to the LTt;

upon the LTt receiving the INVITE-ring message and successfully reserving network resources, beginning, by the LTt, to generate RINGING to the destination user and sending a 180 RINGING message to the AP whereupon the AP begins playing an audible ringback tone to a calling user;

upon the destination user answering the call, sending, by the LTt, a 200 OK message to the AP and generating packets of encoded voice and sending the packets of encoded voice in a stream to the AP using the IP address and port number specified in the INVITE-noring message; and upon receiving the 200 OK message, responding, by the AP, with an ACK message to the LTt.

14. A computer-readable medium having computer-executable instructions for remotely accessing network data services from a wireless station using a Residential/Business Broadband Network (RBN) to access a broadband Internet Protocol network via a service provider's broadband transport network and further via a service provider's broadband packet network wherein the broadband Internet Protocol network provides a transport medium for a user and services rendered by other providers, said user and said services being transparent to the broadband Internet Protocol network, the service provider's broadband transport network and the service provider's broadband packet network, and further wherein the computer-executable instructions are executed on a processor and comprise the steps of:

upon the user activating the wireless station, sending, by the wireless station, a registration message to an access port (AP);

optionally verifying, by the AP, that the wireless station is valid for the RBN of the user;

forwarding, by the AP, the registration message to a network server platform (NSP) via a Media Terminal Adapter (MTA) and one of hybrid fiber coaxial system (HFC) and xDSL system, wherein, where desired, as a security measure, invoking, by the NSP, an authentication procedure with the wireless station to verify the registration and if the authentication procedure fails, then ignoring, by the NSP, the registration message and considering the user as inactive;

upon the NSP accepting the registration by the wireless station, responding, by the NSP, with a Registration ACK to the AP;

forwarding, by the AP, the Registration ACK message to the wireless station and the user starting to receive subscribed network services that include data services; and where desired, accessing other Content Service Providers (CSP) for a special service, sending, by the user, a log-on request to a CSP server and, when the log-on request to the CSP is successful, allowing, by the CSP, the user to access the CSP special service.

15. A computer-readable medium having computer-executable instructions for remotely accessing network data services from an active wireless station registered with an access port (AP) using a Residential/Business Broadband Network (RBN) to access a broadband Internet Protocol network via a service provider's broadband transport network and further via a service provider's broadband packet network wherein the broadband Internet Protocol network provides a transport medium for a roaming user and services rendered by other providers, said user and said services being transparent to the broadband Internet Protocol network, the service provider's broadband transport network and the service provider's broadband packet network, and further wherein the computer-executable instructions are executed on a processor and comprise the steps of:

de-activating, by the roaming user, the active wireless station registered with the AP, whereupon the wireless station sends a De-registration message to the AP;

forwarding, by the AP, the De-registration message to a network server platform (NSP) via a Media Terminal Adapter (MTA) and one of a hybrid fiber coaxial system (HFC) and xDSL system, and entering, by the NSP, an inactive status for the roaming user;

roaming, by the roaming user with the wireless station, to a remote location that is also equipped with a broadband local networking service and the RBN and activating the wireless station;

sending, by the wireless station, a Registration message to an AP of the remote location (the visited AP), which verifies that the wireless station is valid for the RBN being visited;

forwarding, by the visited AP, the Registration message to the network server platform (NSP) via a Media Terminal Adapter (MTA) and one of a hybrid fiber coaxial system (HFC) and xDSL system, and where desired, as a security measure, invoking, by the NSP, an authentication procedure with the wireless station to verify registration whereupon the NSP records that the roaming user is now active and associates the wireless station with the remote location, directing, by the NSP, new incoming services for the wireless station to the remote location, and further, if the authentication procedure fails, ignoring, by the NSP, the registration and maintaining an inactive status for the roaming user;

upon the NSP receiving the remote location of the wireless station, responding, by the NSP, with a Registration Ack to the visited AP;

forwarding, by the visited AP, the Registration Ack to the wireless station to allow the roaming user to receive subscribed network services in the remote location; and where desired, if the user desires to access other Content Service Providers (CSP) for a special service, sending a log-on request to a desired CSP server and upon the log-on request to the CSP being successful, allowing, by the CSP, the user to access the CSP special service.

16. A method for an access port (AP) to provide access functions for a network-centric distribution system that integrates a wireless access service in a local environment through the use of a local Residential/Business Broadband Network (RBN) to a service provider's broadband transport network and to a service provider's broadband packet network that facilitates end-to-end packet telecommunication services, comprising the steps of:

accepting signals from a plurality of wireless devices; and forwarding said signals to an IEEE 802.11b interface for a wireless modem, wherein said signals comprise intranet telephony and data.

17. A method for an Access Port (AP) to provide access functions for a network-centric distribution system that integrates a wireless access service in a local environment through the use of a local Residential/Business Broadband Network (RBN) to a service provider's broadband transport network and to a service provider's broadband packet network that facilitates end-to-end packet telecommunication services, comprising the steps of:

accepting signals from a plurality of wireless devices; and forwarding said signals to an Ethernet interface for a Voice over Internet Protocol (VOIP)/Ethernet Processor, wherein said signals comprise intranet telephony and data.

18. A method for a Media Terminal Adapter (MTA) to support access functions for a network-centric distribution system that integrates a wireless access service in a local environment through the use of a local Residential/Business Broadband Network (RBN) to a service provider's broadband transport network and to a service provider's broadband packet network that facilitates end-to-end packet telecommunication services, comprising the steps of:

accepting voice signals from a plurality of tip/ring interfaces; and forwarding said voice signals to an Ethernet interface for a Voice over Internet Protocol (VOIP)/Ethernet processor.

19. A method for a Media Terminal Adapter (MTA) to support access functions for a network-centric distribution system that integrates a wireless access service in a local environment through the use of a local Residential/Business Broadband Network (RBN) to a service provider's broadband transport network and to a service provider's broadband packet network that facilitates end-to-end packet telecommunication services, comprising the steps of:

accepting voice signals from a plurality of tip/ring interfaces; and forwarding said voice signals to a broadband transport interface for back haul of data and voice packets.

20. A method for an Intelligent Broadband Access Point (IBAP) to provide access functions for a network-centric distribution system that integrates a wireless access service in a local environment through the use of a local Residential/Business Broadband Network (RBN) to a service provider's broadband transport network and to a service provider's broadband packet network that facilitates end-to-end packet telecommunication services, comprising the steps of:

accepting signals from a plurality of wireless devices;

forwarding said signals to an IEEE 802.11b interface for a wireless modem, wherein said signals comprise intranet telephony and data;

accepting voice signals from a plurality of tip/ring interfaces; and forwarding said voice signals to an Ethernet interface for a Voice over Internet Protocol (VOIP)/Ethernet processor.

21. A method for an Intelligent Broadband Access Point (IBAP) to provide access functions for a network-centric distribution system distribution that integrates a wireless access service in a local environment through the use of a local Residential/Business Broadband Network (RBN) to a service provider's broadband transport network and to a service provider's broadband packet network that facilitates end-to-end packet telecommunication services, comprising the steps of:

accepting signals from a plurality of wireless devices;

forwarding said signals to an IEEE 802.11b interface for a wireless modem, wherein said signals comprise intranet telephony and data;

accepting voice signals from a plurality of tip/ring interfaces; and forwarding said voice signals to a broadband transport interface for backhaul of data and voice packets.

22. A method for an Intelligent Broadband Access point (IBAP) to provide access functions for a network-centric distribution system that integrates a wireless access service in a local environment through the use of a local Residential/Business Broadband Network (RBN) to a service provider's broadband transport network and to a service provider's broadband packet network that facilitates end-to-end packet telecommunication services, comprising the steps of:

accepting signals from a plurality of wireless devices;

forwarding said signals to an Ethernet interface for a Voice over Internet Protocol (VOIP)/Ethernet Processor, wherein said signals comprise intranet telephony and data;

accepting voice signals from a plurality of tip/ring interfaces; and forwarding said voice signals to an Ethernet interface for a Voice over Internet Protocol (VOIP)/Ethernet Processor.

23. A method for an Intelligent Broadband Access Point (IBAP) to provide access functions for a network-centric distribution system that integrates a wireless access service in a local environment through the use of a local Residential/Business Broadband Network (RBN) to a service provider's broadband transport network and to a service provider's broadband packet network that facilitates end-to-end packet telecommunication services, comprising the steps of:

accepting signals from a plurality of wireless devices;

forwarding said signals to an Ethernet interface for a Voice over Internet Protocol (VOIP)/Ethernet Processor, wherein said signals comprise intranet telephony and data;

accepting voice signals from a plurality of tip/ring interfaces; and forwarding said voice signals to a broadband transport interface for back haul of data and voice packets.

* * * * *